(12) United States Patent
Rohee

(10) Patent No.: US 7,922,250 B2
(45) Date of Patent: Apr. 12, 2011

(54) HINGE MECHANISM AND VEHICLE SEAT COMPRISING SUCH A MECHANISM

(75) Inventor: René Rohee, La Chapelle Biche (FR)

(73) Assignee: Faurecia Sieges d'Automobile, Nanterre (FR)

( * ) Notice: Subject to any disclaimer, the term of this patent is extended or adjusted under 35 U.S.C. 154(b) by 323 days.

(21) Appl. No.: 12/048,867

(22) Filed: Mar. 14, 2008

(65) Prior Publication Data
US 2008/0231103 A1 Sep. 25, 2008

(51) Int. Cl.
*B60N 2/235* (2006.01)
(52) U.S. Cl. .................................. 297/367 L
(58) Field of Classification Search ............ 297/366, 297/367 P, 367 R, 367 L, 267 L
See application file for complete search history.

(56) References Cited

U.S. PATENT DOCUMENTS

| | | | | |
|---|---|---|---|---|
| 3,299,466 | A | * | 1/1967 | Werner ........................ 16/324 |
| 5,496,225 | A | | 3/1996 | Droulon |
| 5,779,313 | A | | 7/1998 | Rohee |
| 5,899,533 | A | * | 5/1999 | Tatematsu et al. ........ 297/367 R |
| 6,007,153 | A | * | 12/1999 | Benoit et al. ............. 297/378.12 |
| 6,145,930 | A | * | 11/2000 | Su ............................ 297/367 R |
| 6,325,458 | B1 | | 12/2001 | Rohee et al. |
| 6,402,249 | B1 | * | 6/2002 | Rohee et al. ............... 297/367 R |
| 6,619,744 | B2 | * | 9/2003 | Reubeuze ................. 297/378.12 |
| 6,640,952 | B2 | | 11/2003 | Baloche et al. |
| 6,669,296 | B2 | * | 12/2003 | Moriyama et al. ........ 297/367 R |
| 2006/0226687 | A1 | | 10/2006 | Leconte |
| 2009/0236892 | A1 | * | 9/2009 | Cillierre et al. ............... 297/366 |

FOREIGN PATENT DOCUMENTS

| | | |
|---|---|---|
| DE | 19523254 | 1/1997 |
| DE | 19730646 | 1/1999 |
| DE | 19916361 | 10/1999 |
| DE | 10009038 | 7/2000 |
| FR | 2708237 | 2/1995 |
| FR | 2740406 | 4/1997 |
| FR | 2826320 | 12/2002 |
| WO | WO2007/036691 | 4/2007 |

OTHER PUBLICATIONS

French Preliminary Search Report for the patent French application No. FR0701999, report dated, Nov. 8, 2007, EPO Form 1503.

* cited by examiner

*Primary Examiner* — Peter R Brown
*Assistant Examiner* — David E Allred
(74) *Attorney, Agent, or Firm* — Miller, Matthias & Hull, LLP

(57) ABSTRACT

Hinge mechanism comprising first and second frames connected together by an adjustment device comprising a first set of gear teeth integral with the first frame and a first mobile toothed element engaging with the first set of gear teeth A second toothed element, mounted mobile on the second frame, engages with an additional set of gear teeth integral with the first frame.

14 Claims, 17 Drawing Sheets

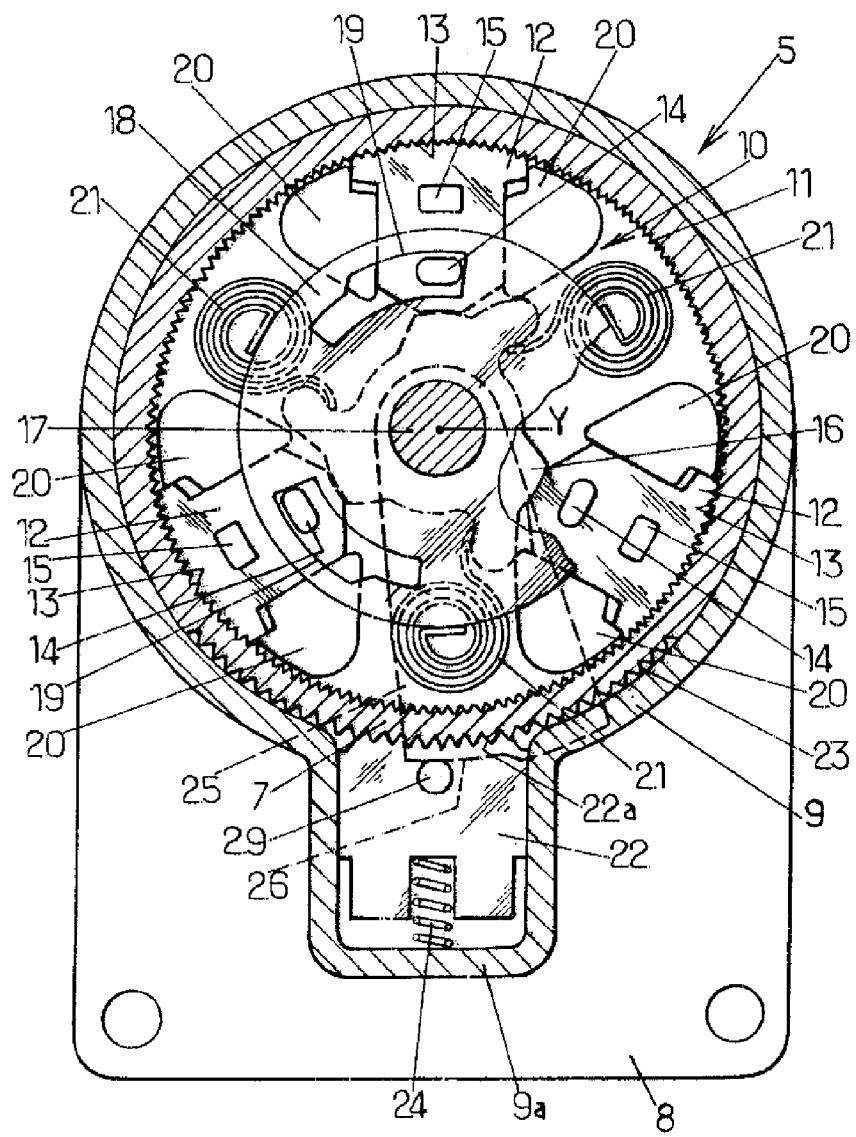
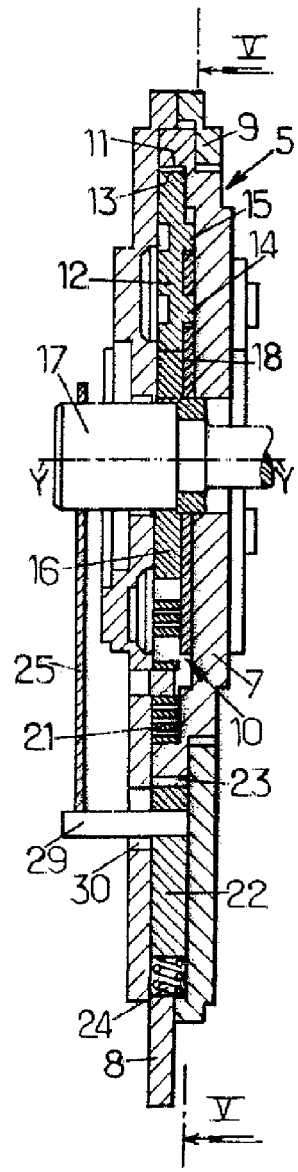
FIG. 5.
FIG. 4.

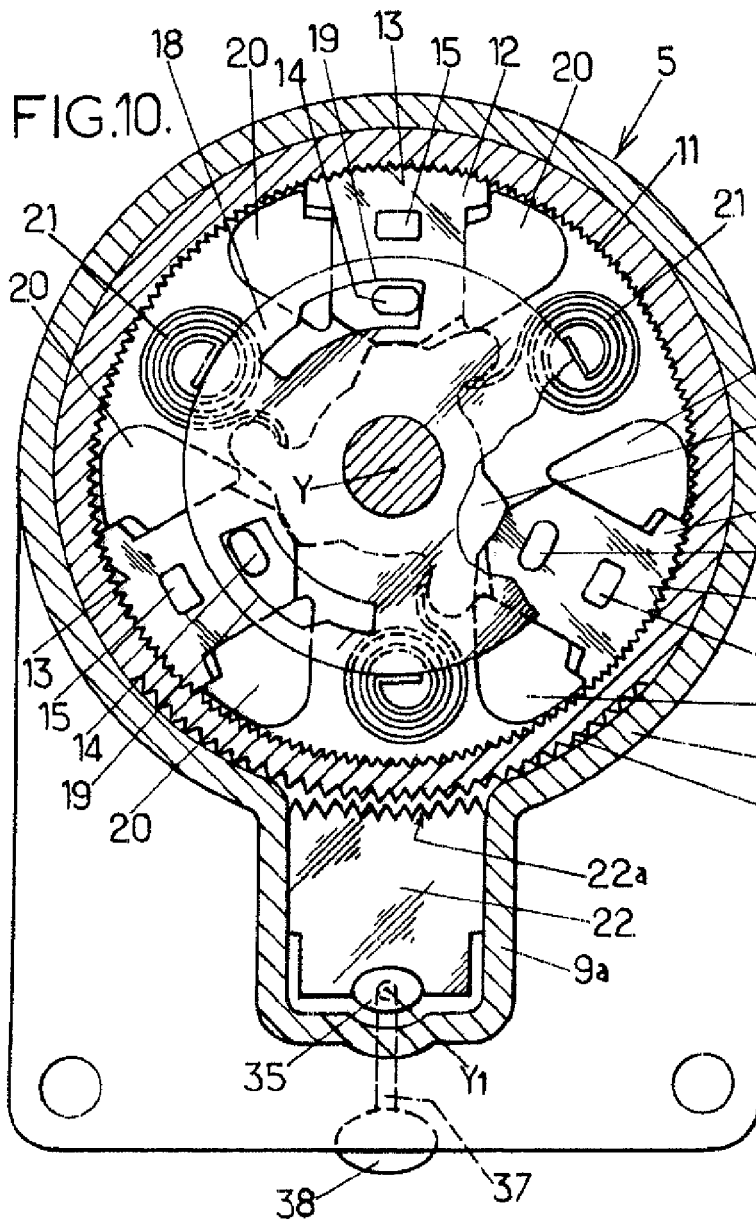
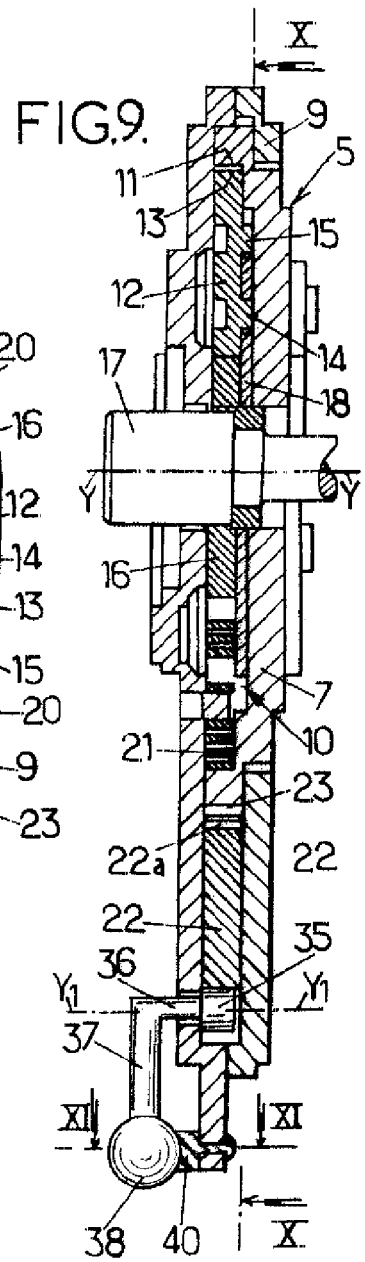
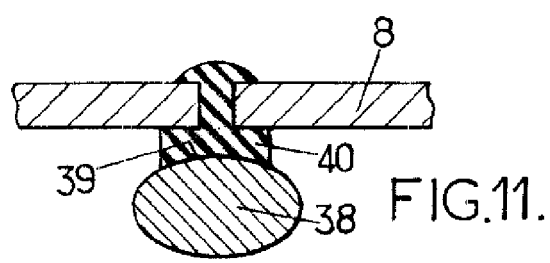

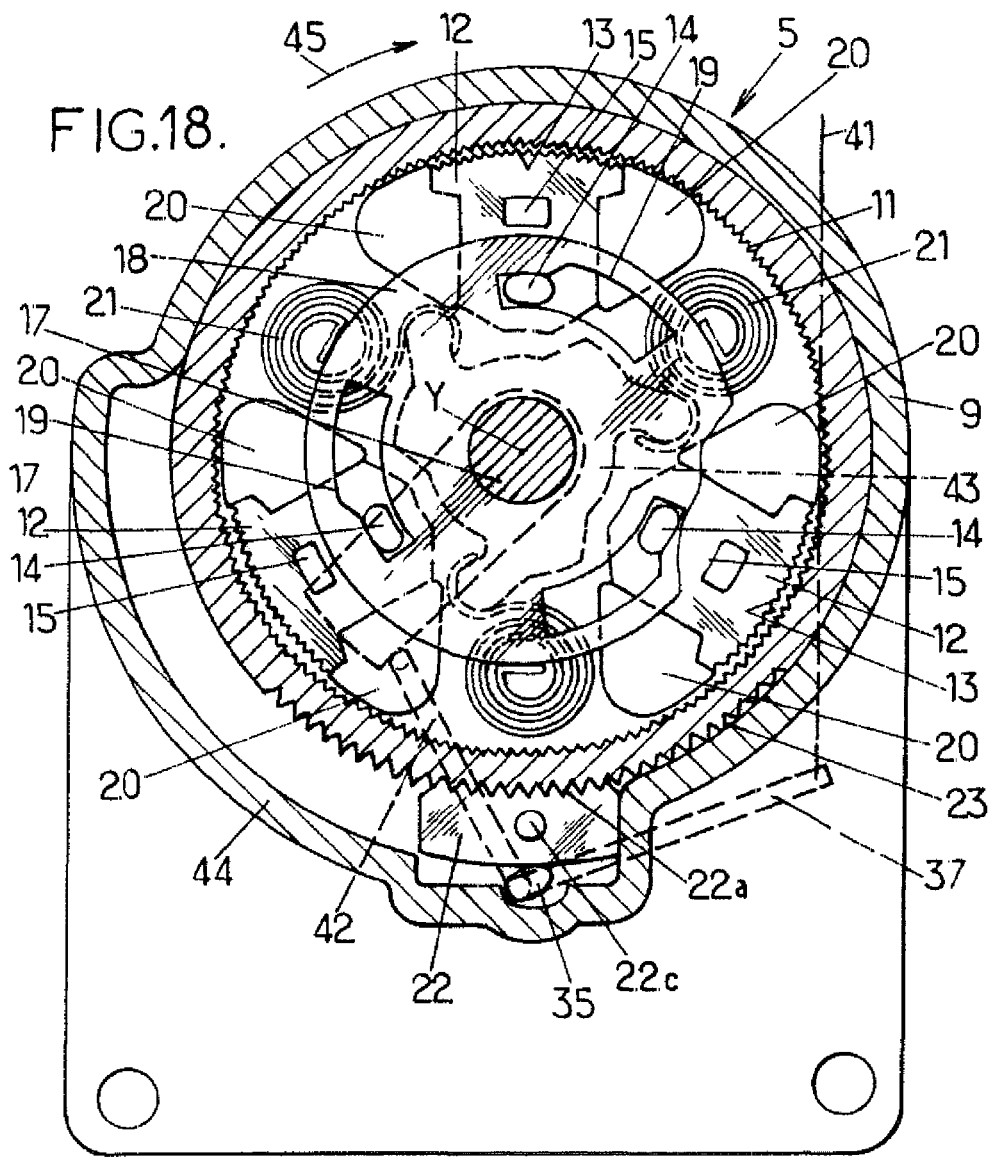
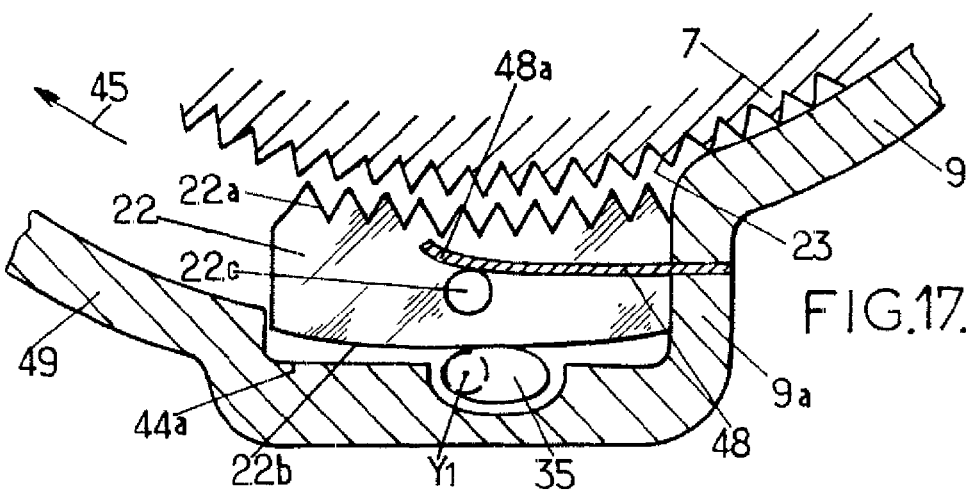

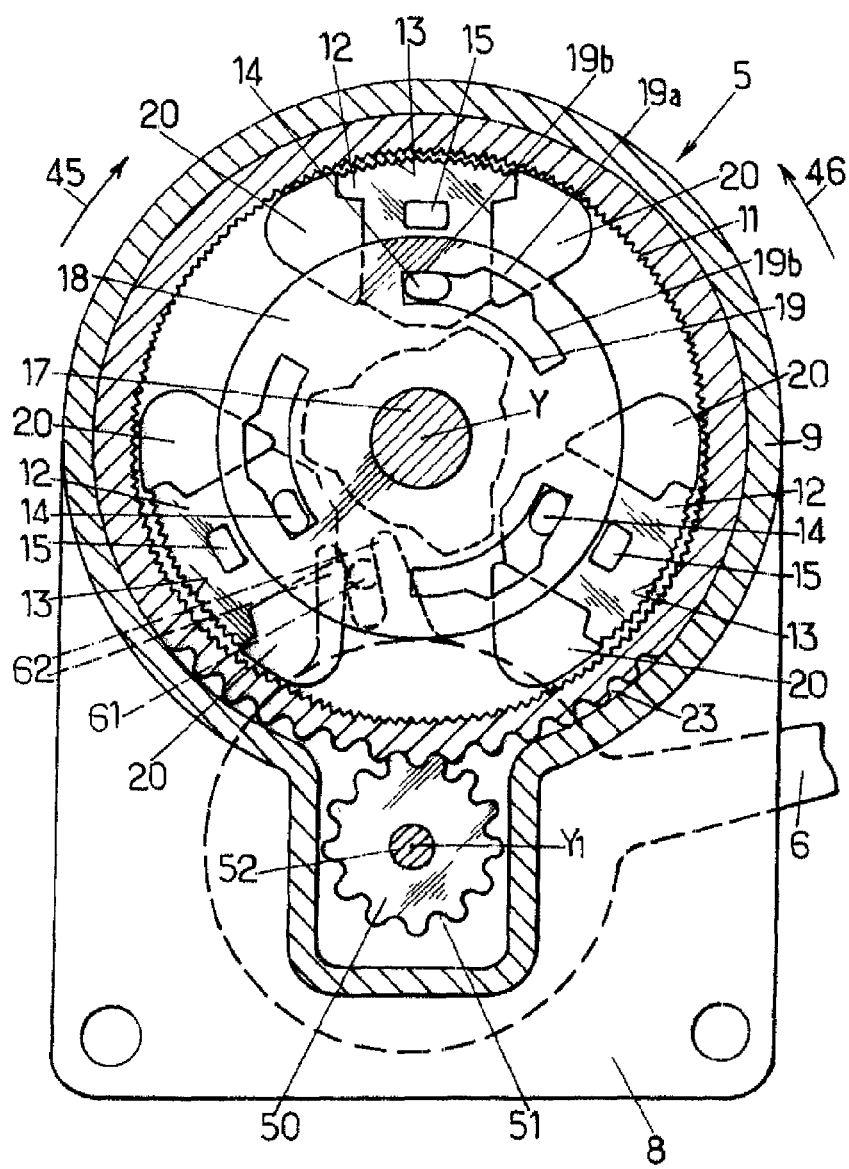
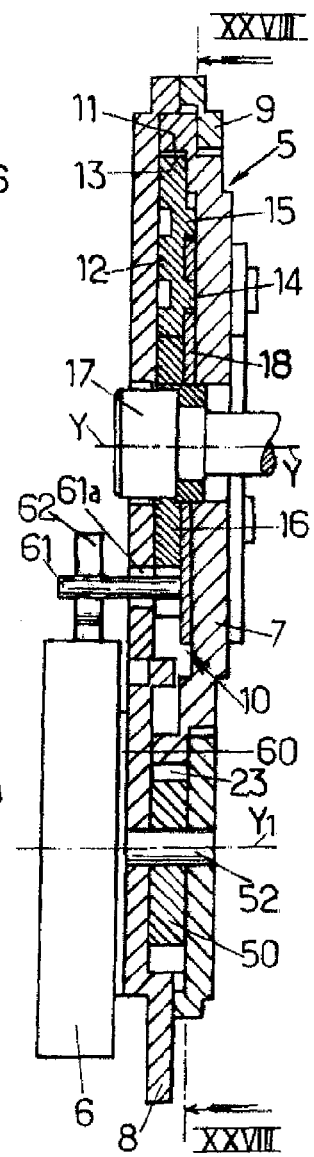
FIG. 29.
FIG. 27.

HINGE MECHANISM AND VEHICLE SEAT COMPRISING SUCH A MECHANISM

FIELD OF THE INVENTION

The present invention relates to hinge mechanisms for vehicle seats and seats comprising such mechanisms.

More particularly, the invention relates to a hinge mechanism comprising:
- first and second frames rotatably mounted in relation to each other about an axis of rotation,
- a geared adjustment device connecting the first and second frames together to allow adjustment of a relative angular position of said first and second frames, said adjustment device comprising:
  - at least one first set of gear teeth integral with one of the first and second frames,
  - at least one first toothed element (for example, a cam-controlled locking cam follower when the adjustment device is a locking device, or a circular set of gear teeth oriented radially outwards when the adjustment device is a hypocycloidal gear device, etc.) capable of engaging with said first set of gear teeth and mobile in relation to said first set of gear teeth,
  - and a first actuation device capable of actuating the first toothed element for controlling the adjustment device,
- and a second toothed element borne by the second frame, said second toothed element engaging with an additional set of gear teeth integral with the first frame.

BACKGROUND OF THE INVENTION

The document FR-A-2 708 237 describes an example of such a hinge mechanism, in which:
- the first set of gear teeth is integral with the first frame,
- the first toothed element is an eccentric circular set of gear teeth with respect to the first set of gear teeth, oriented radially outwards and integral with the second frame,
- and the second toothed element is a set of eccentric circular gear teeth with respect to the additional set of gear teeth, oriented radially inwards and integral with the second frame.

This hinge mechanism gives complete satisfaction. In particular, the additional set of gear teeth and the second toothed element of this hinge mechanism make it possible to increase the mechanical strength of the hinge mechanism, in particular in the case of a road accident when this mechanism is used in a vehicle seat. However, this principle can be used only with a hypocycloidal gear adjustment device.

OBJECTS AND SUMMARY OF THE INVENTION

The aim of the present invention is to improve the hinge mechanisms of the previously mentioned type, in particular to propose an arrangement that is compatible not only with hypocycloidal gear adjustment devices, but also with locking adjustment devices (i.e. capable of selectively immobilizing or releasing the relative rotation of the first and second frames in relation to each other).

To this end, according to the invention, a hinge mechanism of the type in question is characterized in that the second toothed element is mounted mobile in relation to the second frame, and in that said hinge mechanism comprises a second actuator device capable of actuating said second toothed element.

Thanks to these arrangements, the second toothed element and the additional set of gear teeth can be used to provide an additional functionality with respect to the adjustment device (additional locking, control of the relative rotation between the first and second frames, or other), even when the adjustment device is a locking device.

In different embodiments of the hinge mechanism according to the invention, it is moreover possible, optionally, to make use of one and/or another of the following arrangements:
- the additional set of gear teeth is oriented radially outwards;
- the first set of gear teeth is oriented radially inwards;
- the adjustment device is capable of selectively immobilizing and releasing the relative rotation of the first and second frames in relation to each other;
- the first toothed element is mounted mobile in relation to the one of the two frames which is not integral with the first set of gear teeth, said first toothed element being displaceable between, on the one hand, a locking position where said first toothed element is engaged with the first set of gear teeth and, on the other hand, an unlocking position where said first toothed element is not engaged with said first set of gear teeth;
- the first set of gear teeth is integral with the first frame and the first toothed element is mounted mobile in relation to the second frame;
- the first actuation device comprises at least one first cam mobile between first and second positions and elastically loaded towards the first position, said first cam acting on the first toothed element so that it is in locking position when said first cam is in first position and in unlocking position when said first cam is in second position;
- the first cam is capable of pushing back the first toothed element into locking position when said first cam is in the first position and allowing the first toothed element to be displaced towards the unlocking position when said first cam is in the second position;
- the first cam is integral with an unlocking plate capable of displacing the first toothed element into the unlocked position when said first cam is in second position;
- the second toothed element is mounted mobile in relation to the second frame between, on the one hand, a locking position where said second toothed element is engaged with the additional set of gear teeth and, on the other hand, an unlocking position where said second toothed element is not engaged with said additional set of gear teeth;
- the second actuation device comprises at least one second cam mobile between first and second positions and acting on the second toothed element;
- said second cam is elastically loaded towards the first position;
- the second cam is capable of placing the second toothed element in the unlocking position when said second cam is in the second position and allowing the second toothed element to be displaced towards the locking position when said second cam is in the first position;
- the second toothed element is elastically loaded towards the locking position;
- the first and second cams are integral with each other;
- the second toothed element comprises teeth each having first and second flanks oriented in first and second angularly opposed directions and the additional set of gear teeth also comprises teeth having two flanks, the second toothed element being arranged such that only the first flanks of its teeth come into contact with the tooth flanks of the additional set of gear teeth when the first toothed element is fully engaged in the first set of gear teeth;

the second toothed element is angularly offset, in relation to a position in which its teeth would be fully engaged in the teeth of the additional set of gear teeth when the first toothed element is fully engaged in the first set of gear teeth;

the second toothed element is arranged to engage with the additional set of gear teeth after the first toothed element has engaged with the first set of gear teeth when the first and second cams are displaced from the second towards the first position;

the second actuation device is capable of displacing the second toothed element into the locking position when said hinge mechanism is subjected to adequate acceleration;

the second actuation device comprises a second cam controlled by a lever bearing a counterweight;

the second actuation device comprises means of retention for retaining the counterweight in a position corresponding to the unlocking position of the second toothed element so long as it is not subjected to an acceleration greater than a predetermined value;

the second cam is capable of placing the second toothed element in the locking position when said second cam is in the second position and allowing the second toothed element to be placed in the unlocking position when said second cam is in the first position, the second toothed element being elastically loaded towards the unlocking position;

the first and second cams are integral with first and second coupling elements, the second coupling element being capable of acting on the first coupling element, displacing the first cam from the first to the second position when the second cam is actuated to be displaced from the first to the second position, while the first coupling element is adapted so that it does not foul the second coupling element when the first cam is actuated to be displaced from the first to the second position;

the first and second coupling elements are levers;

the second frame comprises a guide capable of guiding the second toothed element while keeping it engaged with the additional set of gear teeth during a rotation between the first and second frames after an actuation of the second cam towards the second position;

the guide extends angularly between the first and second stops and comprises a notch at the position of the first stop, said notch allowing the second toothed element to be displaced into the unlocking position only at the position of the first stop;

the second toothed element comprises a lateral pin and the second frame comprises a flexion spring arranged close to the first stop, said flexion spring comprising an end ramp which is capable of engaging on the pin when the second toothed element is angularly displaced in the guide towards the first stop, and said flexion spring being capable of elastically loading the second toothed element towards the unlocking position when said second toothed element is at the position of the first stop;

the second toothed element is a pinion which is mounted rotatably on the second frame and which engages with the additional set of gear teeth;

the second actuation device comprises an electric motor driving the second toothed element;

the first actuation device is electrically controlled synchronically with said electric motor to displace the first toothed element into the unlocking position when said electric motor rotates;

the second actuation device is a pump device actuated by a handle and driving the second toothed element;

said handle is mounted pivotally in relation to the second frame, said handle being elastically loaded towards a position of rest and being displaceable in a first direction starting from the position of rest, in a first angular sector, and in a second direction opposed to the first direction starting from the position of rest, in a second angular sector, and the pump device is capable of:

positively driving the second toothed element, respectively in first and second angularly opposed directions, when the handle is displaced in a direction away from the position of rest respectively in one or the other of the first and second directions, and not driving the second toothed element when the handle is displaced towards the position of rest;

the first actuation device comprises at least one first cam mobile between first, second and third positions and elastically loaded towards the first position, said second and third positions being situated on either side of the first position, said first cam acting on the first toothed element so that it is in locked position when said first cam is in first position and in unlocked position when said first cam is not in first position;

the first cam is integral with an unlocking plate capable of displacing the first toothed element into the unlocked position when said first cam is not in first position.

Moreover, a subject of the invention is also a vehicle seat comprising a seat base and a backrest mounted pivotally in relation to the seat base by means of at least one hinge mechanism as previously defined.

BRIEF DESCRIPTION OF THE DRAWINGS

Other features and advantages of the invention will become apparent during the following description of several of its embodiments, given non-limitatively by way of example, with respect to the attached drawings.

On the Drawings:

FIG. 4 is a cross-sectional view along the line IV-IV of FIG. 3, FIG. 5 is a cross-sectional view along the line V-V of FIG. 4, FIG. 9 is a view similar to FIG. 4, for a hinge mechanism according to a third embodiment of the invention, which can also be used in the seat of FIG. 1, this hinge mechanism comprising a counterweight which is not shown in cross-section in FIG. 9 for greater clarity, FIG. 10 is a cross-sectional view along the line X-X of FIG. 9, FIG. 11 is a cross-sectional detail view along the line XI-XI of FIG. 9, FIG. 17 is a cross-sectional view along the line XVII-XVII of FIG. 15, FIG. 18 is a view similar to FIG. 16, showing the hinge mechanism during the actuation of a member controlling the folding of the backrest, FIG. 27 is a cross-sectional view along the line XXVII-XXVII of FIG. 26, FIG. 29 is a view similar to FIG. 28, showing the hinge mechanism during its actuation.

MORE DETAILED DESCRIPTION

The same references denote identical or similar elements on the different figures.

Figure 1:
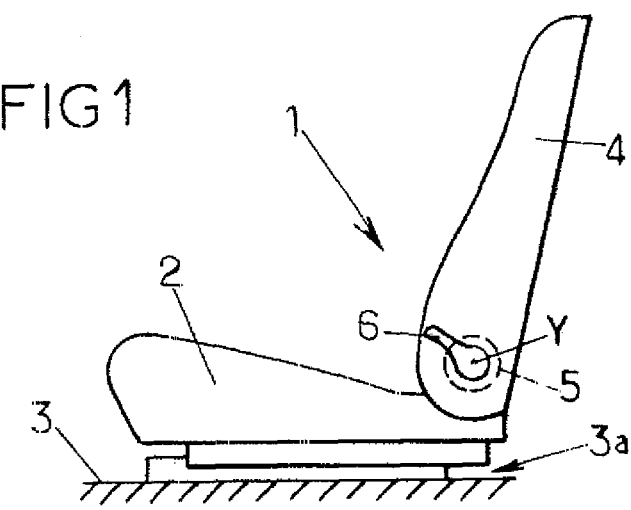
FIG. 1 represents a vehicle seat capable of being equipped with a hinge mechanism according to the invention.

FIG. 1 represents a vehicle seat 1, for example a front seat of a motor vehicle, which comprises a seat base 2 fixed on the floor 3 of the vehicle, for example by means of longitudinal runners 3a, and a backrest 4 mounted pivotally in relation to the seat base 2 about a horizontal transverse axis of rotation Y, by means of at least one hinge mechanism 5 controlled for example by a handle 6 or similar.

In all the embodiments of the invention described hereinafter, the hinge mechanism 5 comprises (see for example FIGS. 2 to 5):
- a first rigid metal frame 7 which is integral for example with the structure of the backrest 4 and which can be realized in particular in the form of a flange extending approximately perpendicular to the axis of rotation Y,
- a second rigid metal frame 8 which is fixed for example to the structure of the seat base 2 (the first frame 7 could if necessary be fixed to the structure of the seat base 2 and the second frame 8 be fixed to the structure of the backrest 4) and which can be realized in particular in the form of a flange extending approximately perpendicular to the axis of rotation Y,
- a closure element 9, for example a rigid metal gusset fixed to the second frame 6, for example by welding, which holds captive the first and second frames 7, 8, against each other while allowing a relative rotation of these two frames 7, 8 in relation to each other about the axis of rotation Y, the first and second frames 7, 8 thus forming an enclosed housing which delimits an internal space,
- and an adjustment mechanism 10, arranged in the previously mentioned internal space and making it possible to adjust a relative angular position between said first and second frames.

The adjustment mechanism 10 of the different embodiments of the invention described herein can be an immobilizing mechanism capable of selectively immobilizing or releasing the relative rotation between the first and second frames 7, 8.

The adjustment mechanism 10 can be for example of the type described in the document FR-A-2 740 406, thus comprising (see FIGS. 4 and 5):
- a first set of gear teeth 11 which is integral with one of the first and second frames 7, 8, for example the first frame 7, wherein said first set of gear teeth 11 can be in particular a circular set of gear teeth centered on the axis Y and oriented radially inwards,
- at least one first toothed element 12, and for example three first toothed elements 12 arranged at 120° from each other about the axis Y, this or each first toothed element 12 being mounted mobile in relation to said first set of gear teeth with respect to the second frame 8, between, on the one hand, a locking position where said first toothed element 12 is engaged with the first set of gear teeth 11 and, on the other hand, an unlocking position where said first toothed element 12 is not engaged with said first set of gear teeth 11.

The adjustment mechanism 10 of the different embodiments of the invention described herein is therefore an immobilizing mechanism capable of selectively immobilizing or releasing the relative rotation between the first and second frames 7, 8 in relation to each other.

In the different embodiments described herein, the first toothed element 12 is realized in the form of a rigid metal plate extending in a plane perpendicular to the axis of rotation Y and having an external set of gear teeth 13 as well as first and second pins 14, 15 projecting axially in the direction of the axis Y and radially offset in relation to each other.

In the different embodiments described herein, the adjustment mechanism 10 also comprises a first actuation device capable of actuating the first toothed element 12 to control the adjustment device 10. This first actuation device can for example comprise:
- a first rigid metal cam 16 which can extend in a plane perpendicular to the axis Y and which can for example be integral with a drive shaft 17 extending along the axis Y,
- an unlocking control disk 18 integral with the first cam 16 and being for example in the form of a rigid metal plate parallel to the first cam 16, said control disk comprising cutouts 19 into which the first pins 14 of the first toothed elements 12 are introduced.

The first cam 17 and the control disk 18 are mounted pivotally about the axis Y between:
- a first position where the first cam 16 pushes back each first toothed element 12 outwards so that it is in locked position (see FIG. 5), and a second position where the first cam 16 stops pushing each first toothed element 12 radially outwards and/or the corresponding cutout 19 acts by cam effect on the first pin 14 to displace the first toothed element 12 radially inwards into the unlocking position.

Moreover, in the different embodiments described herein, the first toothed elements 12 are slidably mounted radially between guides 20 formed in the first frame by stamping (see FIG. 5) and the second pin 15 of each first toothed element can be capable of coming to bear against a circular ramp centered on the axis Y and belonging to the first frame 7 (this circular ramp is not shown on the drawings, but is described and shown in the previously mentioned document FR-A-2 740 406) to prevent the first toothed elements 12 engaging with the first set of gear teeth 11 in certain relative angular positions of the first and second frames.

The first cam 16 and the control disk 18 can be elastically loaded towards their first position, for example by means of springs 21 arranged in the inside space between the first and second frames 7, 8 and integral with the second frame 8.

Moreover, according to the invention, the hinge mechanism also comprises at least one second rigid metal toothed element which is mounted mobile in relation to the second frame 8 and which is controlled by a second actuation device, said second toothed element comprising a set of gear teeth 22a oriented radially inwards and engaging with an additional integral set of gear teeth 23 of the first frame 7

Advantageously, the sets of gear teeth 22a and 23 can be arranged in a mutually corresponding fashion, approximately in a common plane perpendicular to the axis Y.

In the first embodiment of the invention, which is shown in FIGS. 2 to 6, the second toothed element 22 is mounted mobile in relation to the second frame 8 between, on the one hand, a locking position where said second toothed element 22 is engaged with the additional set of gear teeth 23 and, on the other hand, an unlocking position where said second toothed element 22 is not engaged with said second additional set of gear teeth 23. The additional set of gear teeth 23 in question can be a circular set of gear teeth centered on the axis Y (forming a circle which can be complete or not), formed on an external periphery of the first frame 7 and oriented radially outwards.

The second toothed element 22, for its part, can be in the form of a rigid metal cam follower extending in a plane perpendicular to the axis Y and mounted for example slidably approximately radially with respect to the axis Y between the second frame 8 and the gusset 9, in a guide 9a formed in the gusset 9 for example by stamping.

The second toothed element 22 can be elastically loaded towards its locking position, for example by means of a spring 24 bearing on the gusset 9 and/or on the second frame 8.

The second actuation device, which controls the second toothed element 22, can also comprise a second cam 25 which can for example be integral with the drive shaft 17 and thus be mobile between said first and second positions with the first cam 16.

Figure 2:
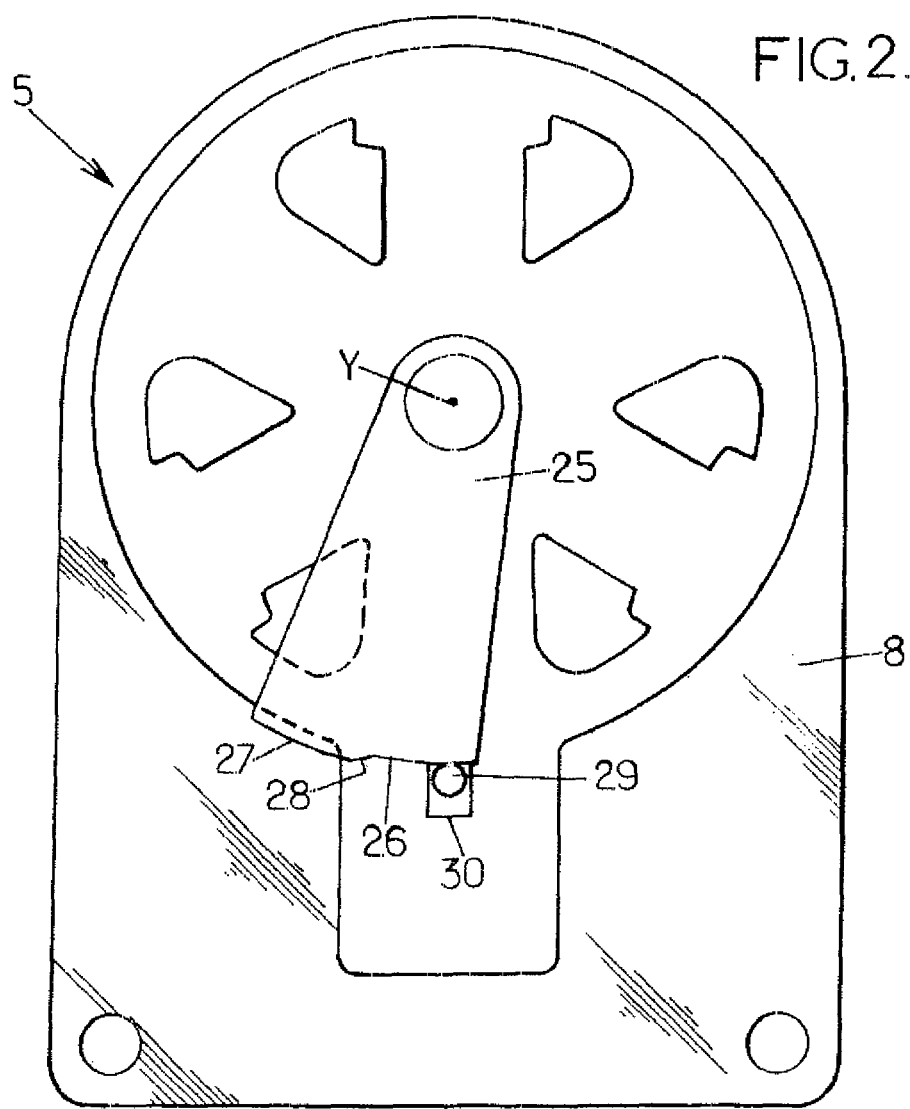
FIG. 2 is a view of one of the faces of a hinge mechanism according to a first embodiment of the invention, capable of equipping the seat of FIG. 1, said hinge mechanism being in the position of rest.
Figure 3:
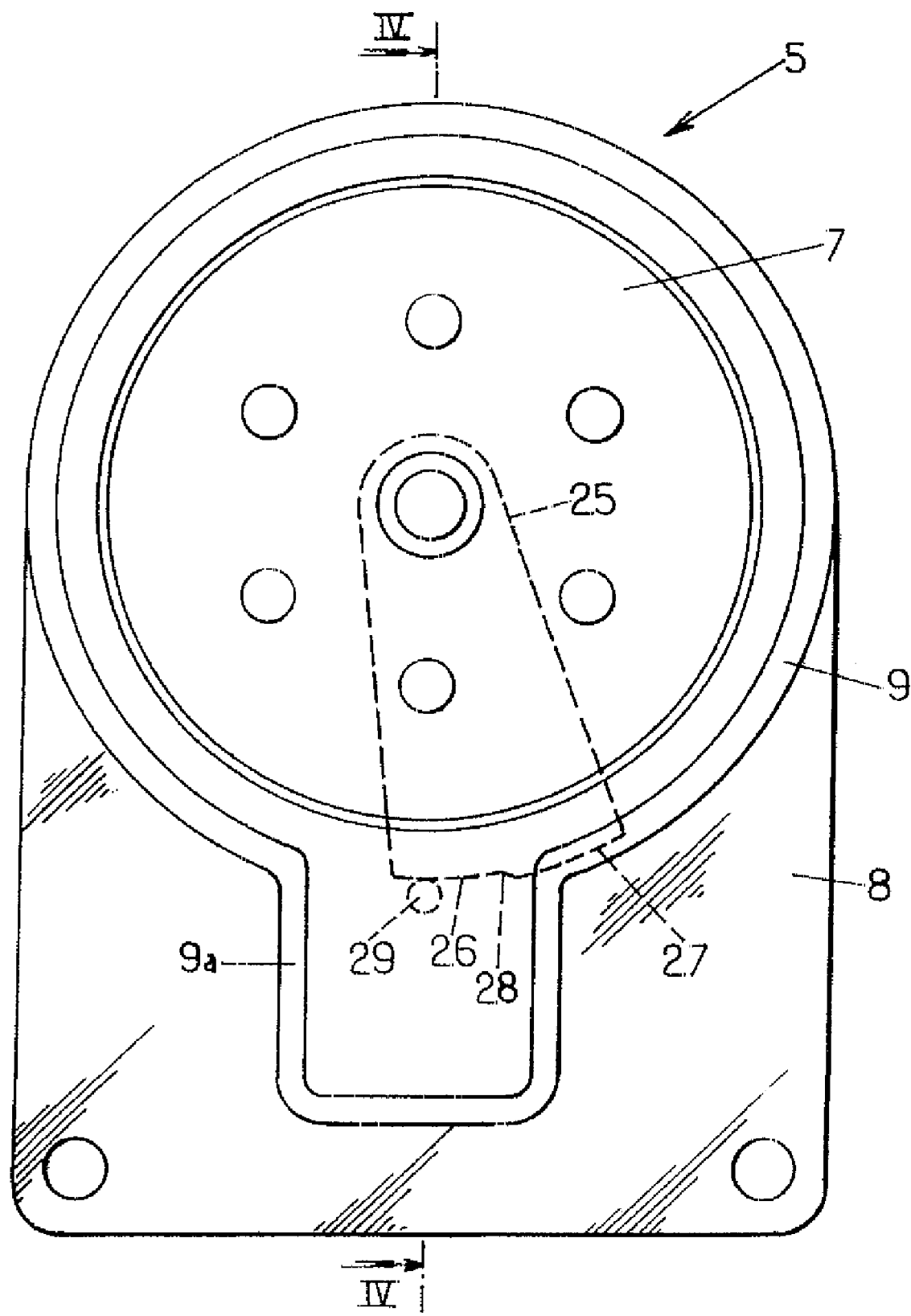
FIG. 3 is a view of the other face of the hinge mechanism of FIG. 2.
Figure 6:
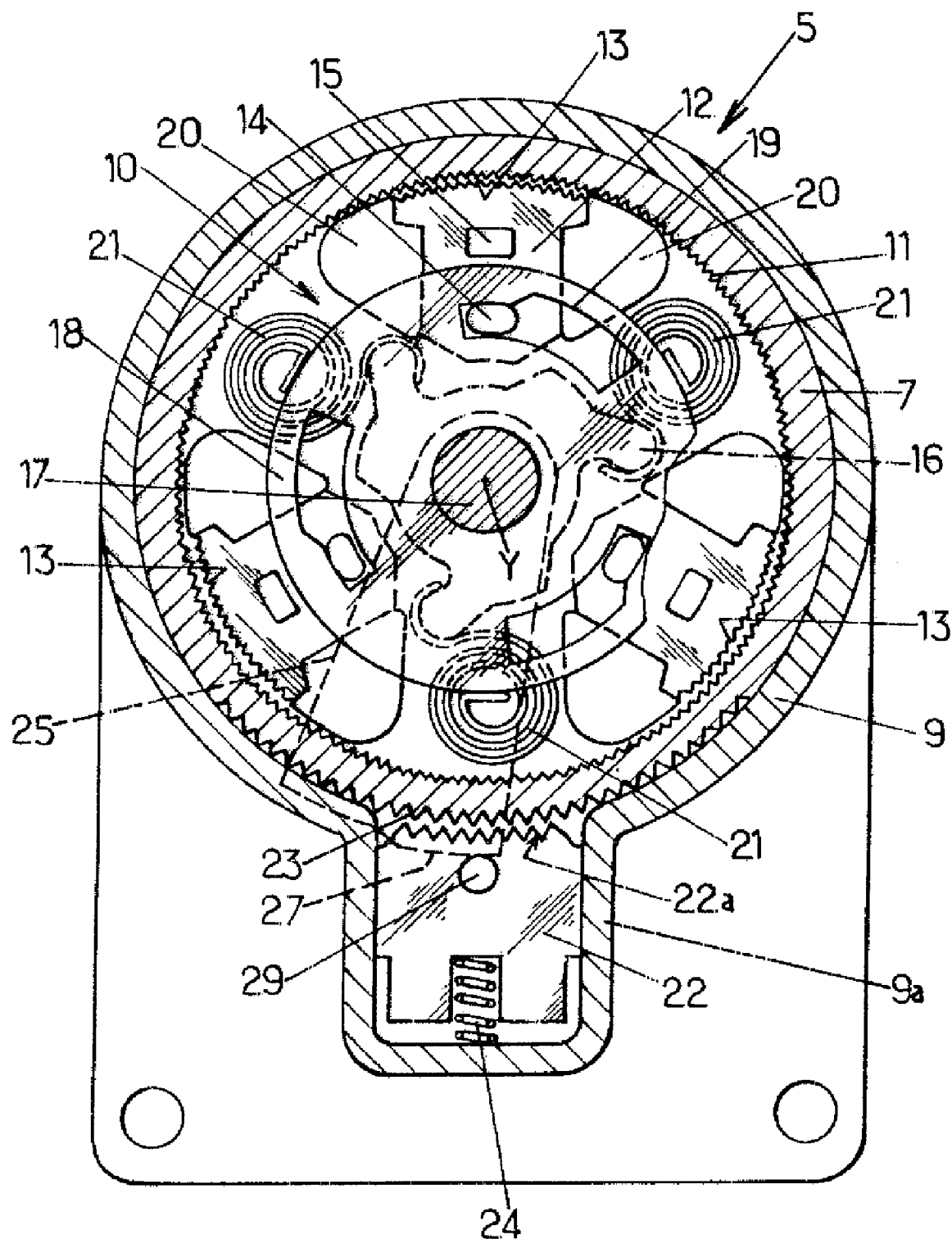
FIG. 6 is a view similar to FIG. 5, showing the hinge mechanism during its actuation.

The second cam 25 can for example have the form of a sheet metal plate extending in a plane perpendicular to the axis Y and having an end edge which comprises first and second circular portions 26, 27 centered on the axis Y, the second circular portion 27 having a radius greater than the first circular portion 26 and being connected to said first circular portion 26 by an inclined ramp 28 (see FIG. 2).

Moreover, the second toothed element 22 is integral with a rigid metal rod 29 or other which projects axially in the direction of the axis Y and passes through a radial opening 30 provided in the second frame 8 (see FIGS. 2 and 4).

Under the effect of the spring 24, the rod 29 is pressed towards the end edge of the second cam 25. When the second cam 25 and the first cam 16 are in their first position, the rod 29 is opposite the first portion 26 of the end edge of the second cam 25, such that the second toothed element 22 can engage with the additional set of gear teeth 23.

However, when the first and second cams 16, 25 are displaced into their second angular position:
on the one hand, the first toothed elements 12 are displaced into their unlocking position (see FIG. 6),
and the second portion 27 of the end edge of the second cam 25 pushes back the rod 29 and the second toothed element 22 radially outwards, such that said second toothed element 22 is placed in the unlocking position again, thus making it possible for a user to adjust the angular position of the backrest 4 as required, by manual action or by action of the back on said backrest 4.

When the handle 6 is released by the user, the first and second cams 16, 25, return to first position, such that the first toothed elements 12 and the second toothed element 22 return to locking position.

Thanks to the presence of the second toothed element 22, the mechanical strength of the hinge mechanism 5 is increased, which enhances the safety of users of the seat 1.

The second embodiment of the invention is very similar to the first embodiment of the invention and therefore will not be described in detail.

Figure 7:
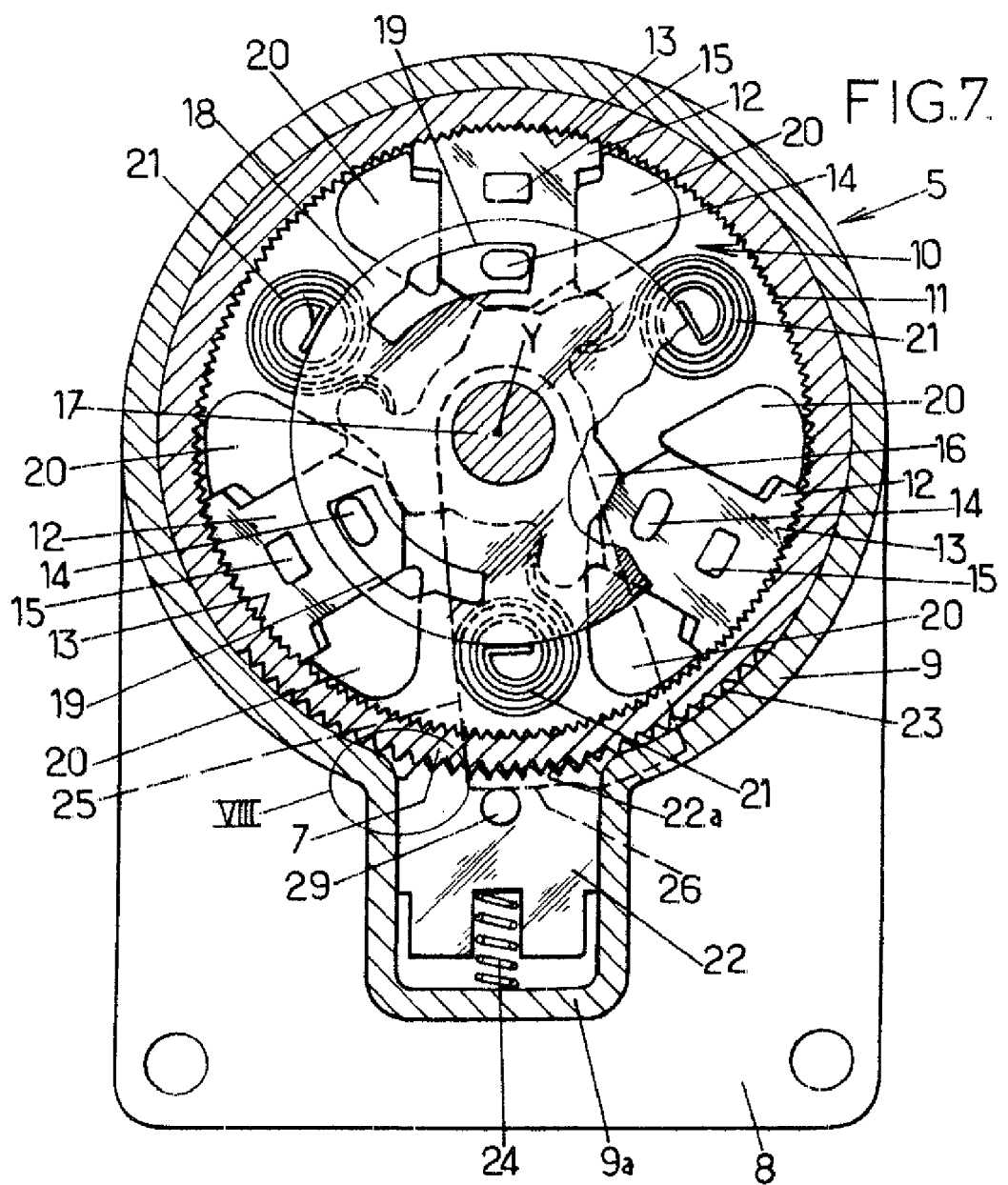
FIG. 7 is a view similar to FIG. 5, for a hinge mechanism according to a second embodiment of the invention, which can also be used in the seat of FIG. 1.
Figure 8:
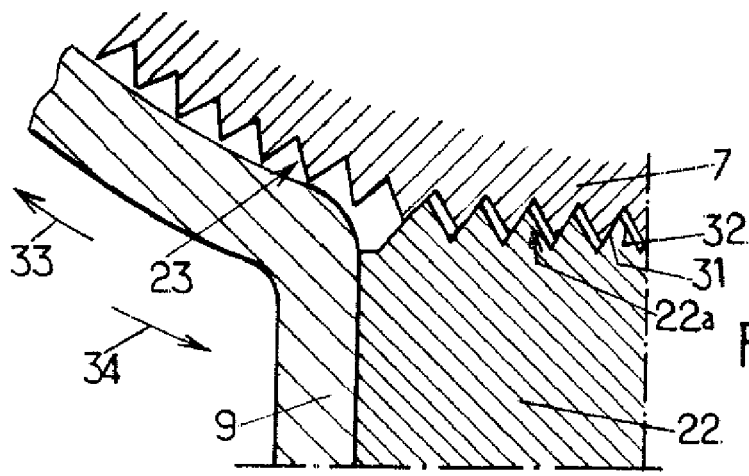
FIG. 8 is a detail view VIII of FIG. 7.
Figure 12:
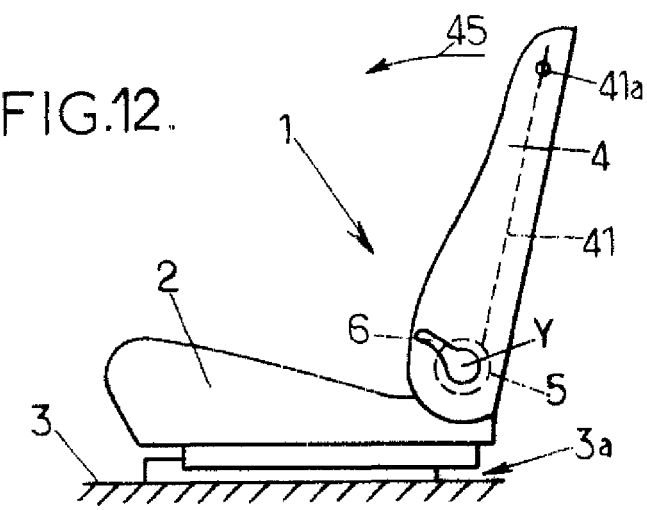
FIG. 12 is a diagrammatic view of a vehicle seat capable of being equipped with a hinge mechanism according to a fourth embodiment of the invention.

The second embodiment of the invention, shown in FIGS. 7 and 8, is distinguished from the first embodiment previously described only by the fact that the second toothed element 22 is slightly angularly offset about the axis of rotation Y, with respect to the position that it occupies in the first embodiment.

In fact, in the first embodiment of the invention, the position of the second toothed element 22 is such that its teeth are fully engaged with the teeth of the additional set of gear teeth 23 when the first toothed elements 12 are fully engaged with the first set of gear teeth 11, while in the second embodiment, the teeth of the second toothed element 22 are not fully engaged with the teeth of the additional set of gear teeth 23 when the first toothed elements 12 are fully engaged with the first set of gear teeth 11.

On the other hand, in the second embodiment, when the adjustment device 10 locks and the teeth of the first toothed element 12 fully engage with the first set of gear teeth 11, only the flanks 31 of the teeth of the set of gear teeth 22a, oriented in a first angular direction 33, come into contact with the flanks of the teeth of the additional sets of gear teeth 23 (see FIG. 8). In this position, the opposite flanks 32 of the teeth of the set of gear teeth 22a, oriented in the opposite angular direction 34, are not in contact with the corresponding flanks of the teeth of the additional set of gear teeth, such that the contact between the set of gear teeth 22a and 23 presses the first frame in the angular direction 33. This pressure takes up any play which may be present in the adjustment device 10.

In the second embodiment of the invention, the second toothed element 22 can be arranged such as to engage with the additional set of gear teeth 23 after each first toothed element 12 has engaged with the first set of gear teeth 11 when the first and second cams are displaced from the second to the first position;

The third embodiment of the invention, shown in FIGS. 9 to 11, is also very similar to the first embodiment of the invention and therefore will not be described in detail.

Said third embodiment is distinguished from the first embodiment only by the following points:
the hinge mechanism does not comprise either the second cam 25, or the rod 29, or the opening 30, or the spring 24, the second toothed element 12 is normally in the unlocking position (said second toothed element can for example be mounted freely sliding vertically with friction in the guide 9a, and be arranged on the lower part of the hinge mechanism such that its unlocking position is the low position, as in the example shown; in a variant, the second toothed element could be elastically loaded towards its unlocking position), the second actuation device, which controls the second toothed element, is capable of displacing said second toothed element into the locking position when the seat is subjected to an adequate acceleration (positive or negative).

The second actuation device can comprise for example a second rigid metal cam 35 which is mounted pivotally in relation to the second frame about a horizontal axis of rotation Y1, parallel to the axis Y and perpendicular to the direction of displacement of the vehicle in which the seat 1 is installed. Said second cam can be mounted pivotally for example by means of a rigid metal shaft 36 rotating in the second frame, said shaft 36 being integral with a rigid metal lever 37 extending downwards and bearing a counterweight 38.

The second cam 35 can pivot with the counterweight between:

a first position (shown on the drawings) where the lever 37 extends vertically downwards and where it allows the second toothed element to remain in its unlocking position, and at least one second position (preferably two second positions, not shown) where the lever 37 is inclined and where said cam displaces the second toothed element into its locking position.

The second cam can have a symmetrical form with respect to the vertical plane containing the axis Y1 so as to push back the second toothed element 22 into locking position both when the lever 37 pivots forwards and when it pivots backwards.

Means of retention can be provided to keep the counterweight 38 and the second cam 35 in the previously mentioned first position such that said counterweight it is not subjected to acceleration greater than said predetermined value. For example, the counterweight 38 can have a convex form and be engaged on a complementary concave face 39 of a bearing piece 40 (made of plastic or other material) integral with the second frame 8, so as to be normally retained in the position of rest by the bearing piece 40: when the counterweight is subjected to an adequate acceleration in one direction or in the other, for example when the vehicle in which the seat 1 is installed experiences a traffic accident, it releases from the bearing piece and makes the lever 37 and the second cam 35 pivot. Thus, at the exact moment of the accident, the second cam thus places the second toothed element 22 in locking position, increasing the strength of the hinge mechanism, which enhances the safety of the user seated on the seat.

It would of course be possible to replace the bearing piece 40 by other retention means, for example a frangible element, immobilizing the counterweight 38, or the lever 37, or the second cam 35, or the second toothed element.

Further, it would also be possible to remove the counterweight and to actuate the lever 37 by another means, for example by a pyrotechnic pretensioner controlled by an electronic circuit connected to an impact sensor, an accelerometer or similar.

In the fourth embodiment of the invention, shown in FIGS. 12 to 20, the hinge mechanism 5 is similar to that described previously and therefore will not be described again in detail: only the differences with respect to the hinge mechanism 5 previously described are explained hereinafter.

Figure 15:
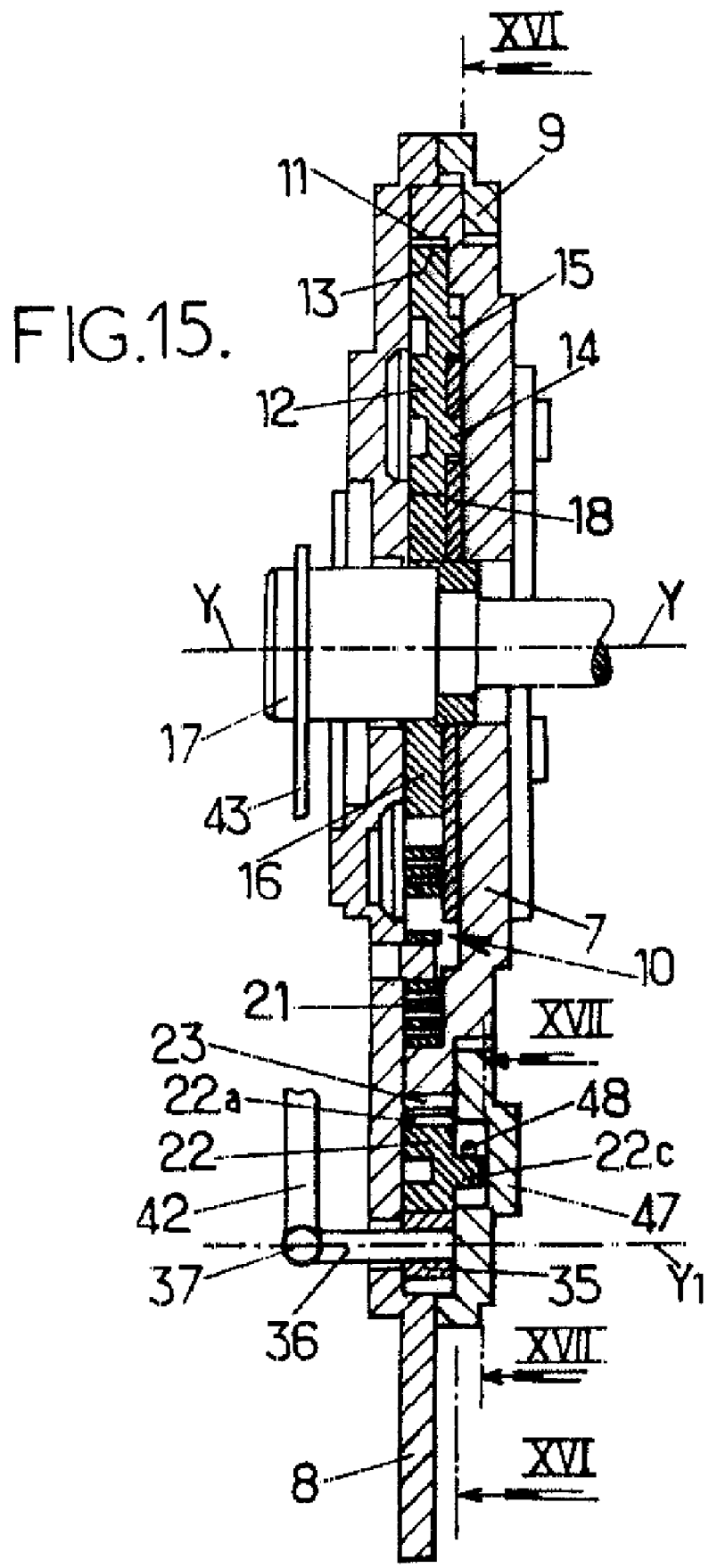
FIG. 15 is a cross-sectional view along the line XV-XV of FIG. 14.
Figure 16:
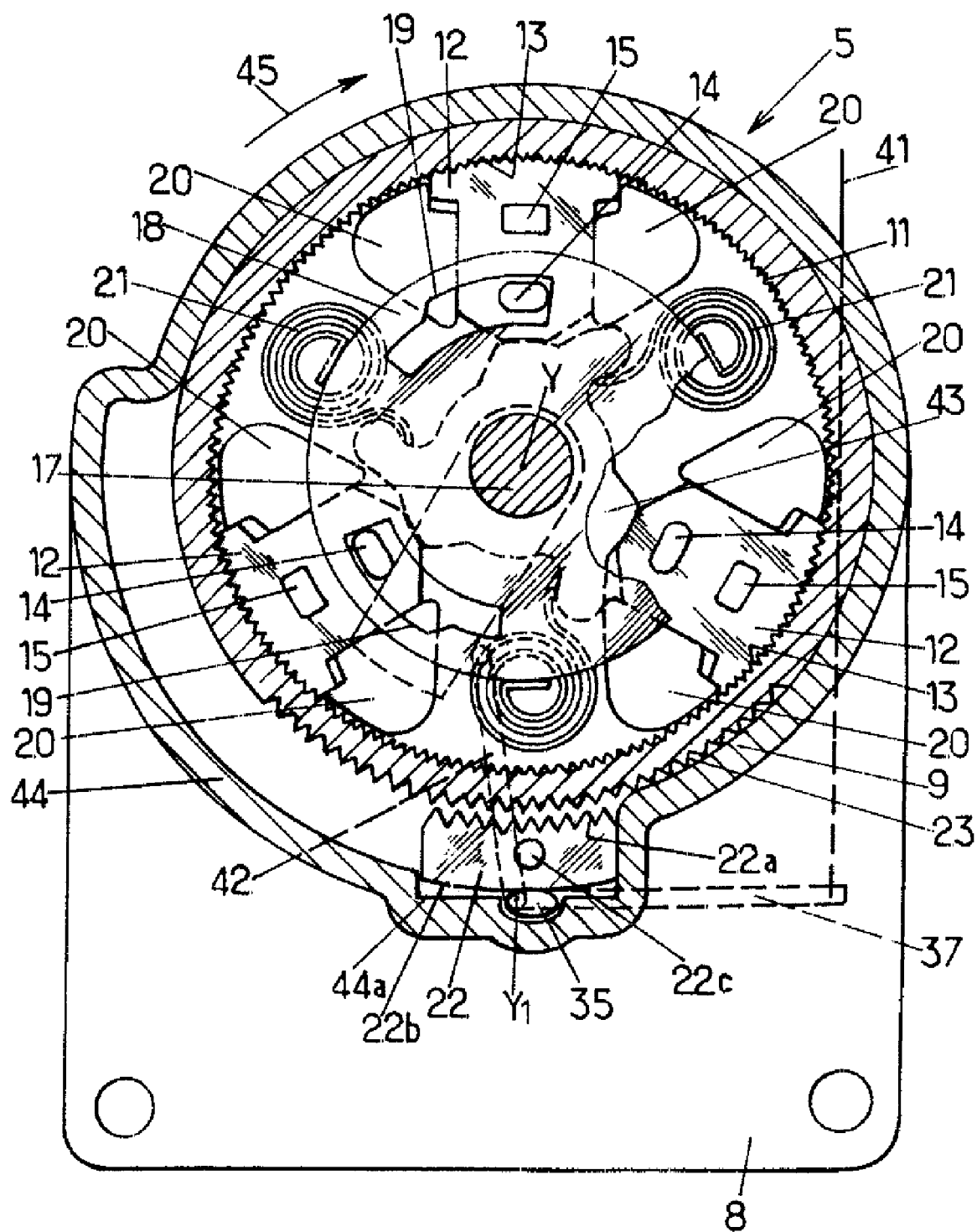
FIG. 16 is a cross-sectional view along the line XVI-XVI of FIG. 15.

As shown in FIGS. 15 and 16, the second toothed element 22 of the fourth embodiment is normally in the unlocking position, as in the third embodiment, and can be displaced towards its locking position by means of a rigid metal cam 35 integral with a rigid metal shaft 36 which turns in the second frame 8. The shaft 36 is itself integral with a rigid metal lever 37 (see FIG. 13), which, in contrast to the third embodiment, extends for example approximately horizontally until reaching a free end integral with one end of a cable 41, the other end of which is controlled by a handle 41a at the top of the backrest, or otherwise (see FIG. 12). The lever 37, whose utility will become apparent hereinafter, could if necessary be controlled by a control device other than the cable 41 and the handle 41a. For example, the lever 37 could be directly integrated with a control handle.

The handle 41a, or other control element, allows a user to fold the backrest 4 of the seat forwards, in the direction of the arrow 45 (FIG. 12), for example to allow the user to gain access to the space situated to the rear of the seat 1 in a three-door vehicle.

In a manner known per se, folding the backrest 4 of the seat 1 can moreover unlock the runners 3a of the seat, allowing the user to move the seat base 2 of the seat forward in order to further improve the access to the space situated to the rear of the seat 1.

Figure 13:
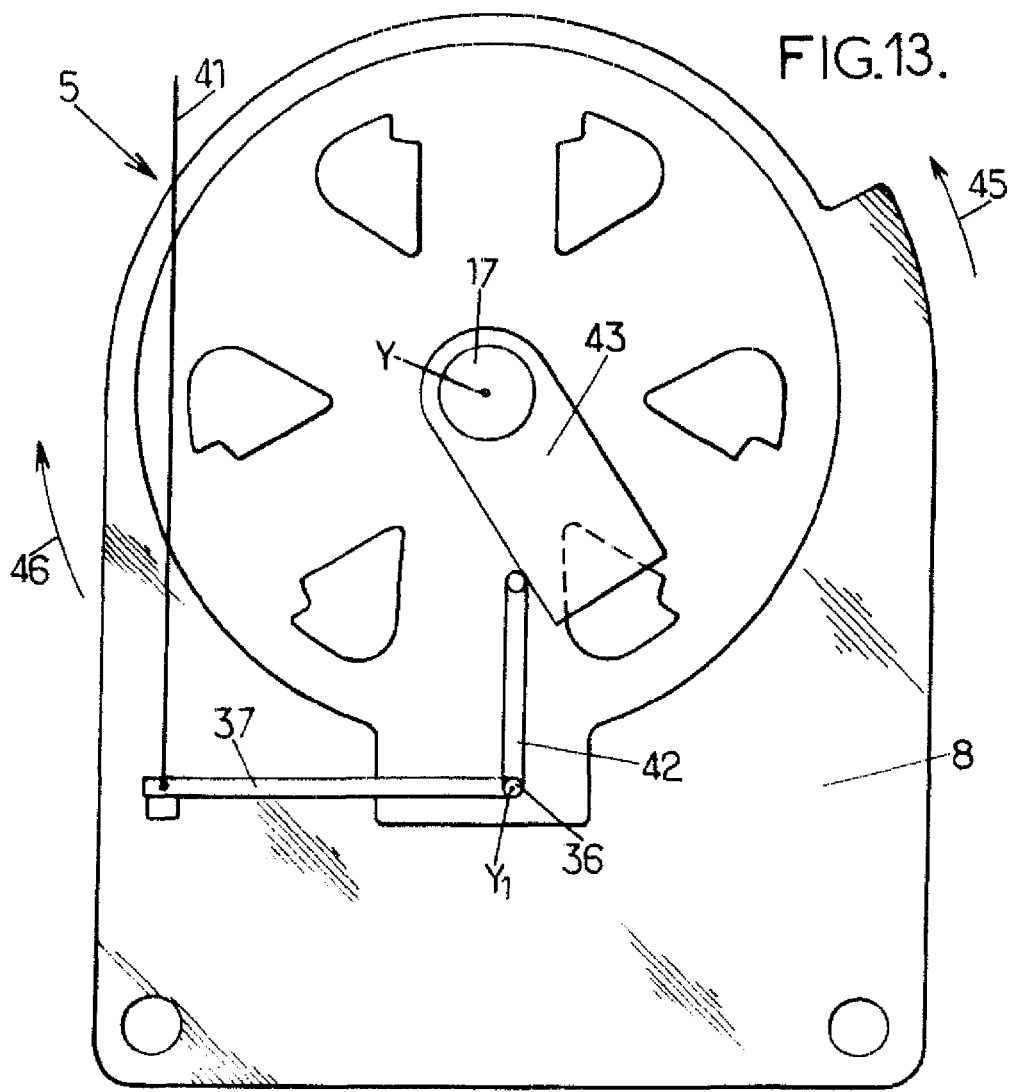
FIGS. 13 and 14 are views similar to FIGS. 2 and 3 for the hinge mechanism according to the fourth embodiment of the invention, the hinge mechanism being shown in the position of rest.
Figure 14:
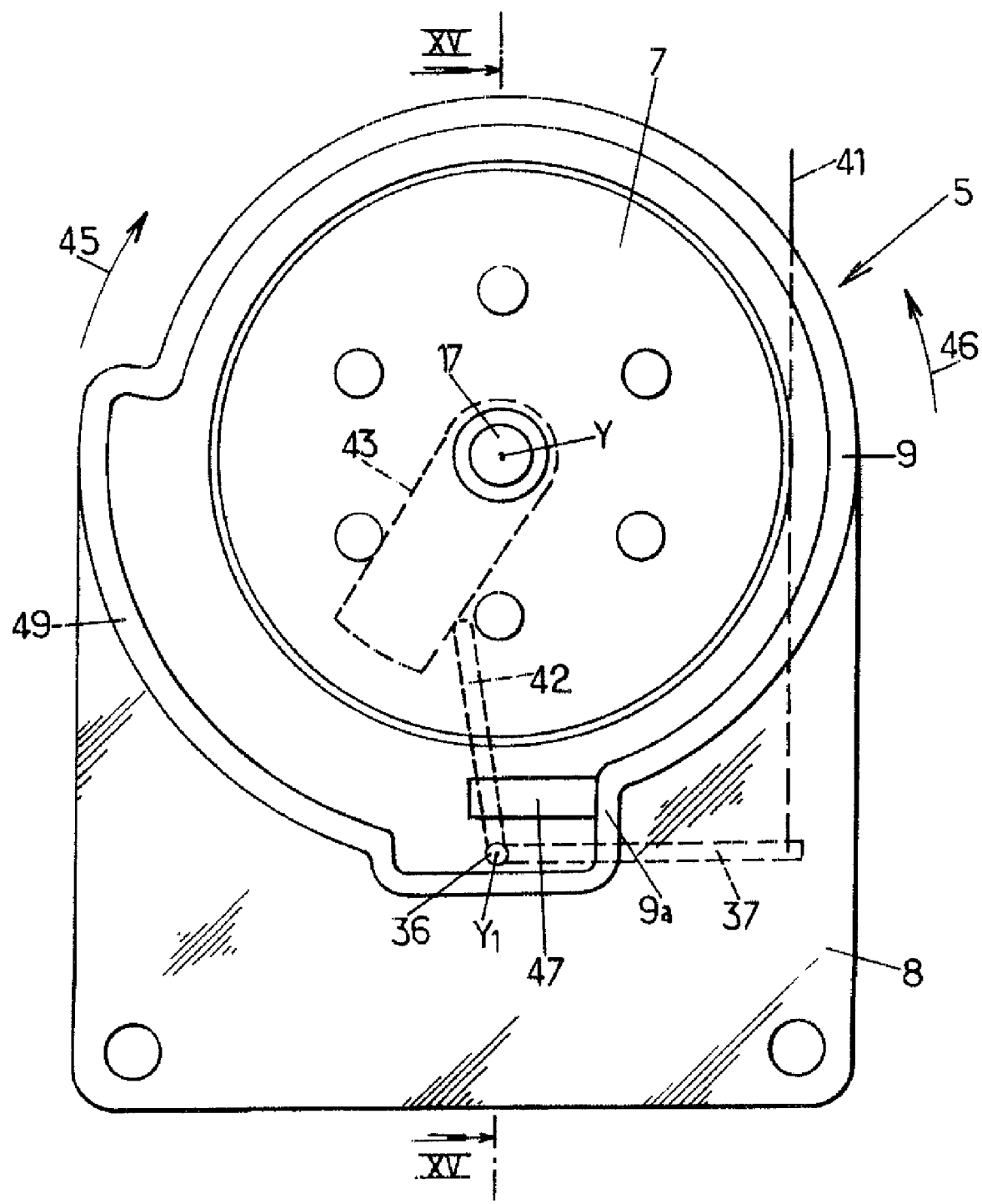

As shown in FIG. 13, the shaft 36 and the lever 37 are also integral with an additional rigid metal lever 42 which, in the example shown, extends approximately vertically upwards in the position of rest, to reach a free end which comes to bear against one of the lateral edges of another lever formed for example by a rigid metal plate 43 integral with the shaft 17 and extending downwards from the shaft 17. The plate 43 and the lever 42 respectively form first and second coupling elements which are arranged such that an actuation of the shaft 17 in the angular direction 45, to unlock the adjustment mechanism 10, does not foul the lever 42, but such that an actuation of the handle 41a causes the levers 37 and 42 to pivot in the angular direction 46 opposite to the direction 45, such that the free end of the lever 42 displaces the plate 43, the control shaft 17 and the first cam 16 in the angular direction 45, unlocking the adjustment device 10.

Moreover, as shown in FIGS. 16 and 17, the closure element 9 here comprises an enlarged part forming a circular guide 44, centered on the axis of rotation Y, which extends in the angular direction 45 starting from the position normally occupied by the second toothed element 22 at rest. In this position of rest shown in FIG. 16, said second toothed element 22 is engaged with a notch 44a of the guide 44 in contact with the previously mentioned guide 9a forming a first stop, which allows said second toothed element not to be engaged with the additional set of gear teeth 23 of the first frame 7 in the position of rest.

The second toothed element 22 comprises a rear edge 22b, opposite to its set of gear teeth 22a, which has a circular form of the same radius as the previously mentioned guide 44. Further, the second toothed element comprises a pin 22c projecting laterally parallel to the axis Y, in a pressing 47 of the closure element 9.

Finally, a flexion spring 48, for example a spring wire or a spring blade, bears on the pin 22c in such a way as to place a load elastically on the second toothed element 22 towards its unlocking position, while normally retaining it in the previously mentioned notch 44a. This flexion spring is attached to the closure element 9 (therefore also to the second frame 8) by one of its ends, and its opposite end forms a ramp 48*a* extending radially inwards at an angle in the angular direction 45 (see FIG. 17).

The hinge mechanism according to the fourth embodiment of the invention, operates as follows.

When a user actuates the handle 6 (FIG. 1) to adjust the angular position of the backrest 4, this actuation unlocks the adjustment device 10, but has no action on the second toothed element 22, which remains lodged in the notch 44*a* of the guide 44. Adjustment of the backrest 4 is therefore carried out in a standard fashion.

On the other hand, when the user actuates the handle 41*a*, it causes the lever 37, the shaft 36, the second cam 35 and the lever 42 to pivot in the angular direction 45 (see FIG. 18), such that the second cam 35 displaces the second toothed element 22 into locking position, where its set of gear teeth 22*a* is engaged with the additional set of gear teeth 23 of the first frame 7. Further, the free end of the lever 42 then acts by cam effect on the lever 43 by causing it to pivot in the angular direction 45 with the first cam 16, thus unlocking the adjustment device 10.

Figure 19:
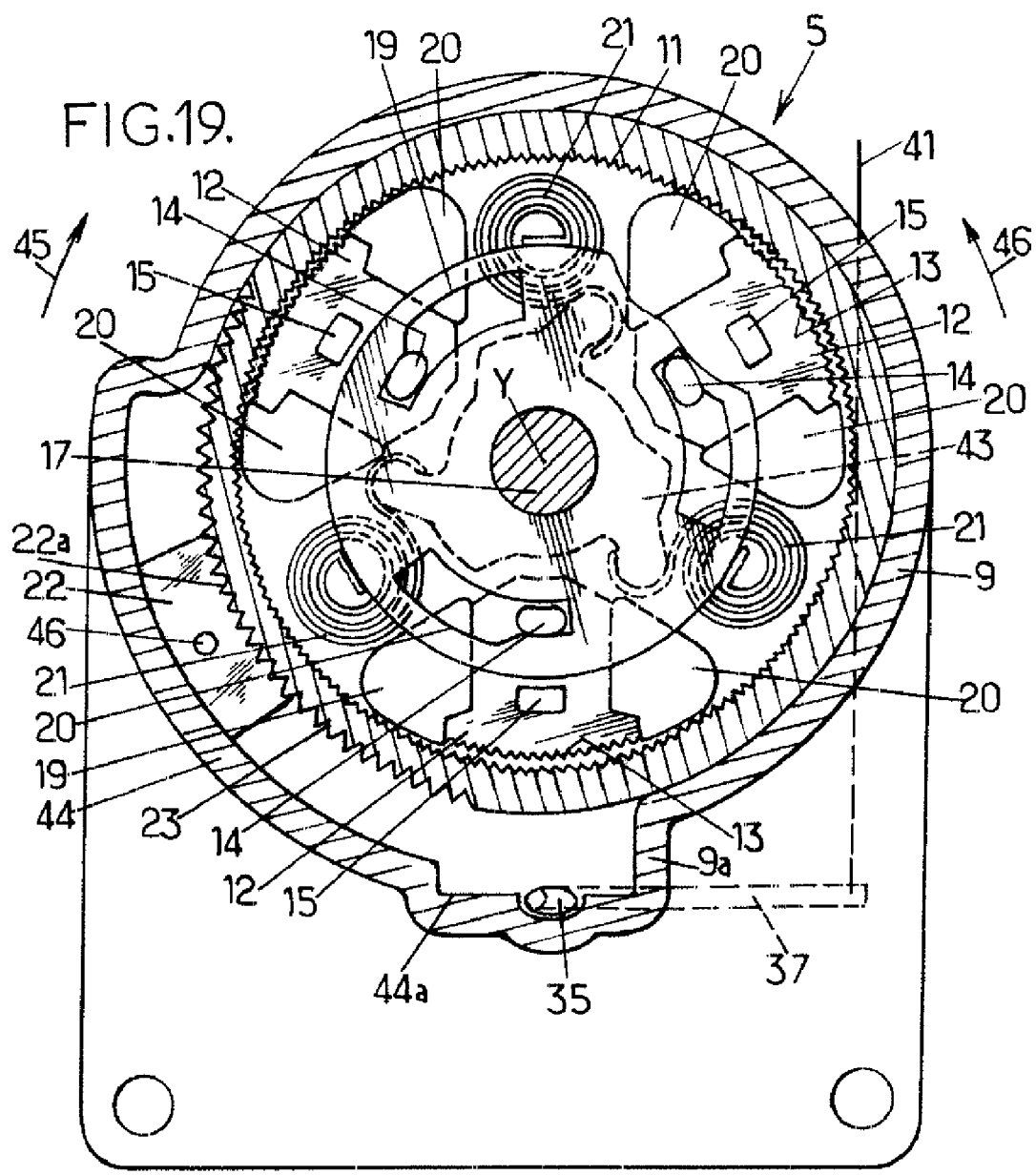
FIG. 19 is a view similar to FIG. 18, showing the hinge mechanism after folding of the backrest.
Figure 20:
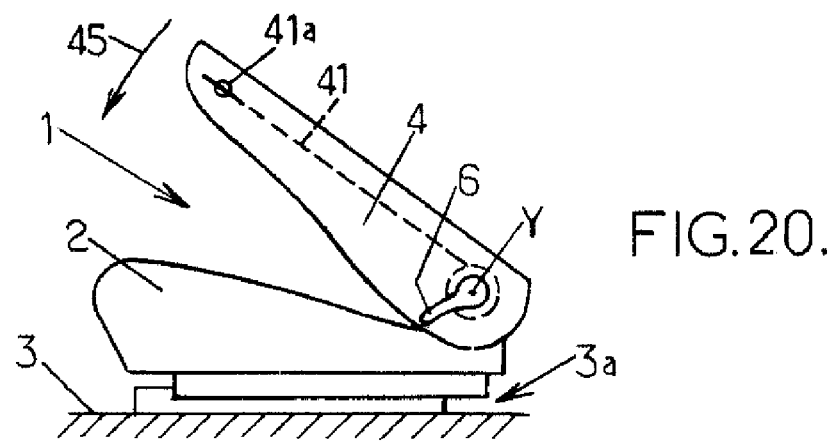
FIG. 20 is a view similar to FIG. 12, showing the seat with its backrest folded.

The backrest 4 can then pivot freely forwards in the angular direction 45, as shown in FIGS. 19 and 20, until the second toothed element 22 encounters a second stop 44*b* at the end of the guide 44. During this movement, the second toothed element 22 is kept engaged with the additional set of gear teeth 23 by its rear edge 22*b* beating against the circular guide 44. During this movement, even if the handle 41*a* is released, the adjustment device 10 can be retained in the unlocked position by the pins 15 of the first toothed elements 12 bearing on the previously mentioned circular ramps of the first frame 7 (non shown, but described for example in the previously mentioned document FR-A-2 740 406). If the handle 6 or 41*a* is released by the user when the backrest is in the angular adjustment range (i.e. when the pins 15 of the toothed elements 12 axe not opposite the circular ramps in question), the backrest locks, thus avoiding the eventuality of the backrest inadvertently being left unlocked. Optionally, the previously mentioned circular ramps can be omitted, which ensures that the backrest re-locks as soon as the handle 6 or 41*a* is released.

When the backrest 4 is then raised (with actuation of the handle 6 or 41*a* by the user), the first frame 7 pivots with the second toothed element 22 in the angular direction 46 opposite to the angular direction 45, until the second toothed element reaches the position opposite the notch 44*a*, abutted against the previously mentioned guide 9*a* of the closure element. When returning to this position, the lifted free end 48*a* of the flexion spring 48 passes above the pin 22*c* of the second toothed element, such that said flexion spring 48 again presses the second toothed element 22 downwards, to engage it in the notch 44*a*. The hinge mechanism then returns to its position of rest as shown in FIG. 16, the backrest being in the angular position that it occupied before being folded forwards.

In the fifth embodiment of the invention, shown in FIGS. 21 to 24, the adjustment device 10 is identical or similar to that described previously, and therefore will not be described again.

On the other hand, in this fifth embodiment of the invention, the second toothed element 50 is a pinion provided with an external involute set of gear teeth 51, integral with a shaft 52 which rotates on the second frame 8 and the closure element 9 so as to be capable of turning about an axis of rotation Y1 parallel to the previously mentioned axis of rotation Y.

The external set of gear teeth 51 of the pinion engages with the previously mentioned additional set of gear teeth 23 of the first frame 7, this additional set of gear teeth here being an involute set of gear teeth.

Figure 22:
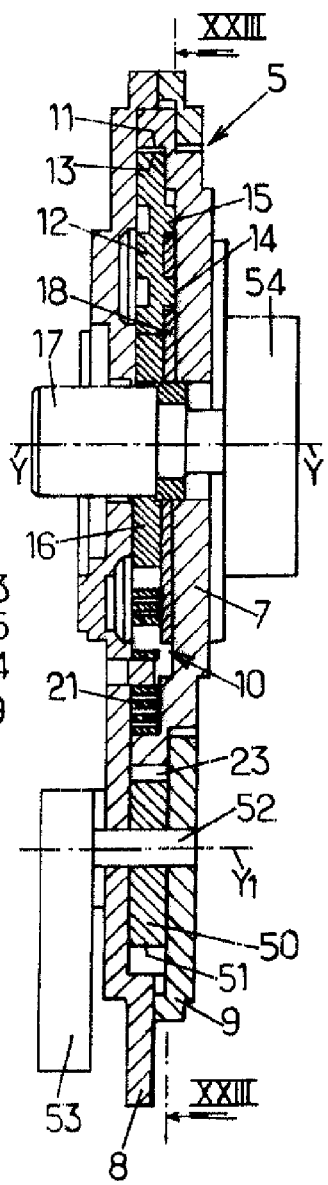
FIG. 22 is an axial cross-sectional view of the hinge mechanism equipping the seat of FIG. 21.

As shown in FIG. 22, the shaft 52 of the second toothed element 50 can be driven rotatably by an electrically-operated geared motor 53. Moreover, the drive shaft 17 of the adjustment device 10 can be controlled rotatably by an actuator 54, for example an actuator with an electromagnet capable either of displacing the drive shaft 17 in the direction of unlocking of the adjustment device 10, or of not acting on the drive shaft 17.

Figure 21:
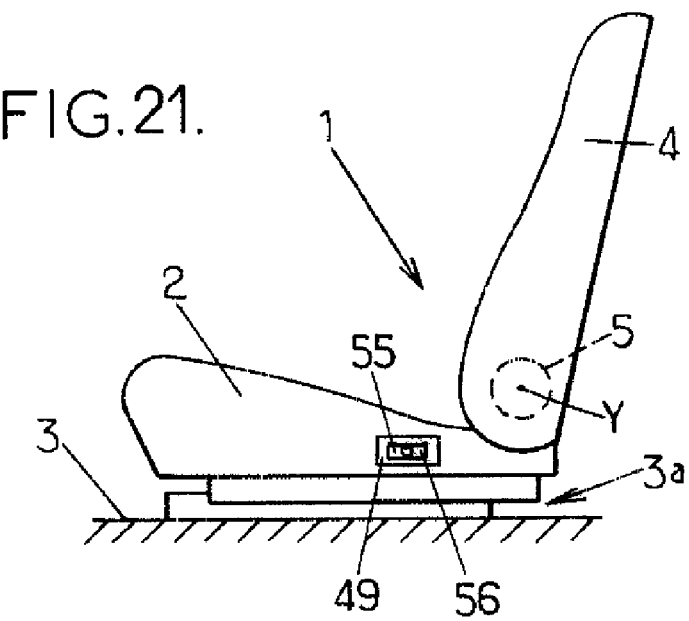
FIG. 21 is a diagrammatic view of a vehicle seat comprising a hinge mechanism according to a fifth embodiment of the invention.

As shown in FIG. 21, the hinge mechanism 5 can be controlled by an electrical control console 49 which can for example comprise two switches 55, 56 (or if appropriate a three-position switch).

Figure 24:
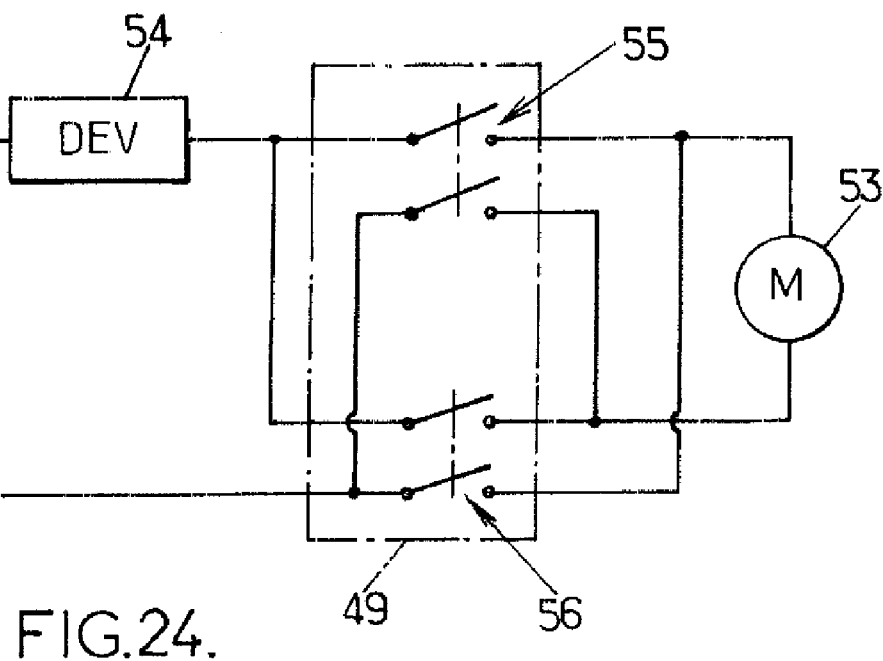
FIG. 24 is an electrical diagram of the seat of FIG. 21.
Figure 23:
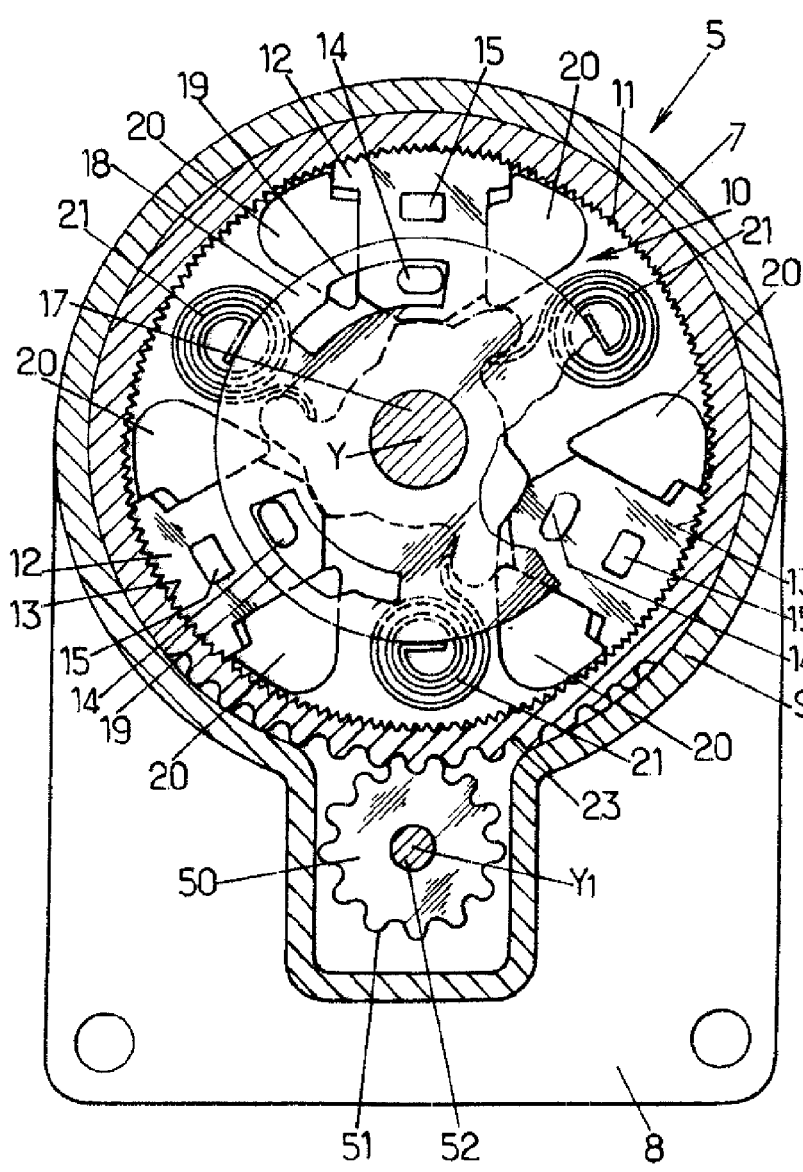
FIG. 23 is a cross-sectional view along the line XXIII-XXIII of FIG. 22.

As shown in FIG. 24, the geared motor 53 (M) and the actuator 54 (DEV) can be powered for example by direct current from the battery 57 of the vehicle.

When the switches 55, 56 are in the position of rest, neither the geared motor 53 nor the actuator 54 are powered.

When the switch 55 is actuated, the actuator 54 is powered and unlocks the adjustment device 10, and the geared motor 53 is powered with a specific polarization which causes it to rotate for example in the direction of folding of the backrest 4 forwards. As soon as the user stops actuating the switch 55, the geared motor 53 stops and the actuator 54 allows the adjustment device to return to the locked position.

When the user actuates the switch 56, the actuator 54 is powered (with the same polarization as in the case of the actuation of the switch 55), which unlocks the adjustment device 10, and the geared motor 53 is powered with a polarization which is the reverse of that obtained during the actuation of the switch 55, such that said geared motor rotates in the opposite direction to that previously described, i.e. for example in the direction of a backwards pivoting of the backrest 4.

In the fifth embodiment of the invention, an electrically-controlled hinge mechanism 5 is thus obtained which, thanks to the presence of the adjustment device 10, has excellent mechanical strength.

Figure 25:
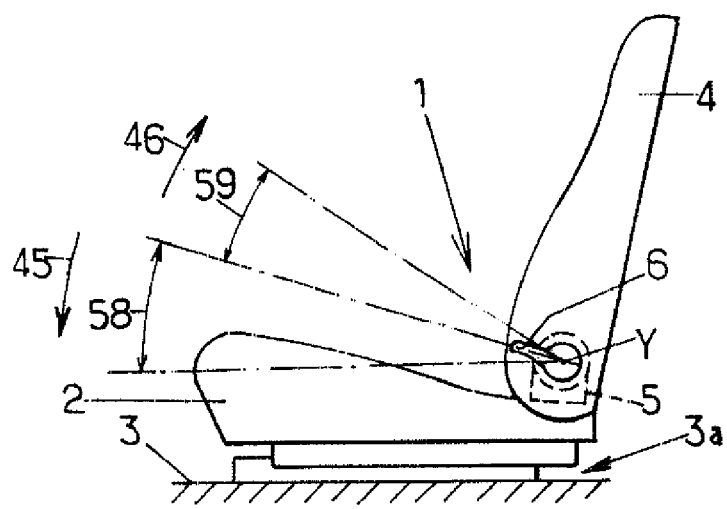
FIG. 25 is a diagrammatic view of a seat comprising a hinge mechanism according to a sixth embodiment of the invention.
Figure 26:
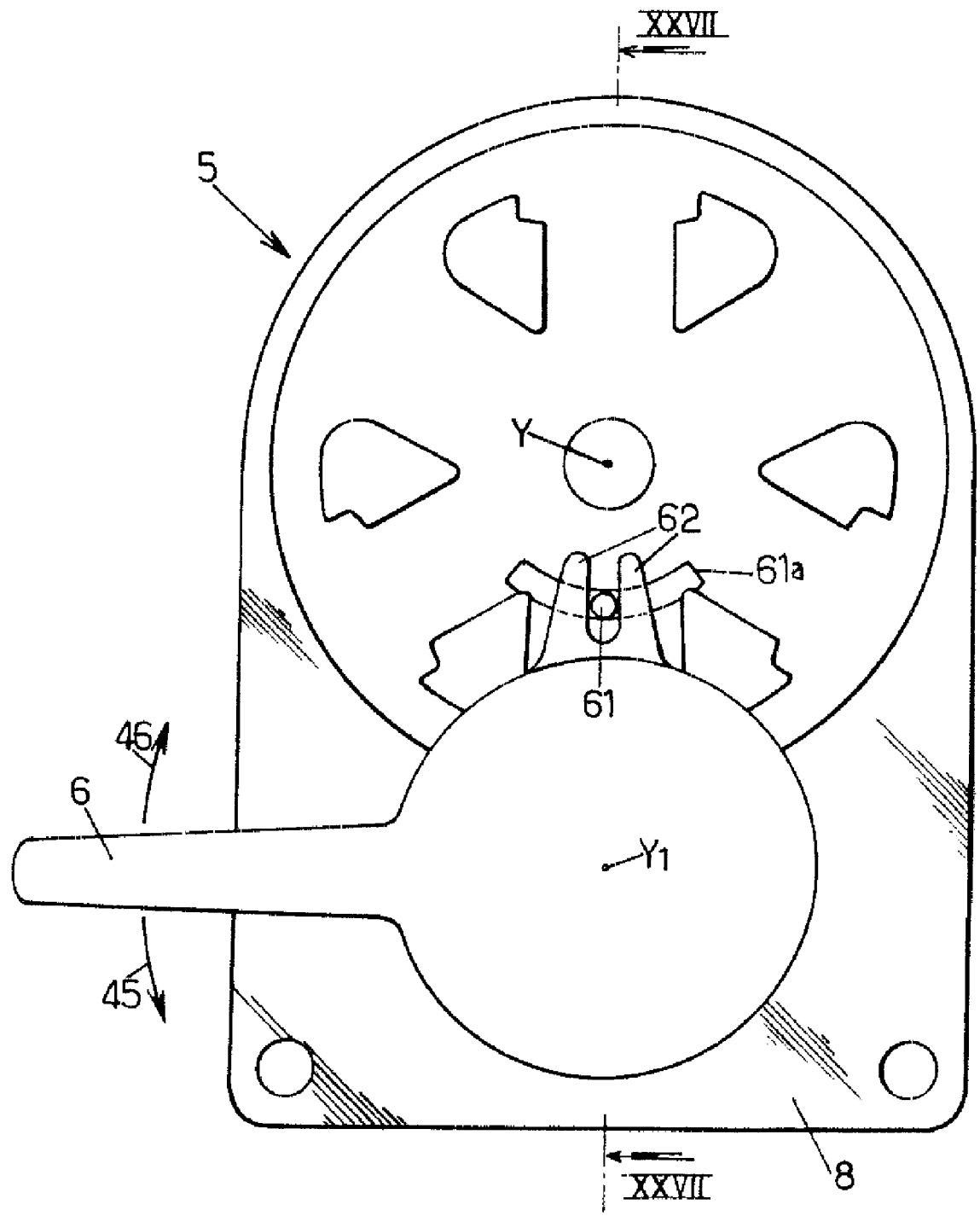
FIG. 26 is a view of one side of the hinge mechanism equipping the seat of FIG. 25, this hinge mechanism being shown in the position of rest.

In the sixth embodiment of the invention, shown in FIGS. 25 to 27, the hinge mechanism 5 is similar to that described in the fifth embodiment of the invention, since its second toothed element 50 is once again a pinion which engages with the additional set of gear teeth 23.

On the other hand, in this sixth embodiment of the invention, the hinge mechanism is not controlled by an electrical device, but by a pump device actuated by the previously mentioned handle 6.

Pump devices of this type are known, and for example a pump device of the type described in the document FR-A-2 826 320 could be used.

As shown in FIG. 25, the handle 5 is mounted pivotally in relation to the second frame 8 about the axis of rotation Y1, said handle 6 being elastically loaded towards a position of rest N and being displaceable in a first angular direction 45 starting from the position of rest N, in a first angular sector 58, and in a second angular direction 46 opposite to the first direction, starting from the position of rest N, in a second angular sector 59.

The pump device 60 (see FIG. 27) the output element of which is integral with the shaft 52, is capable of:

positively driving the second toothed element 50, respectively in first and second angularly opposed directions, when the handle 6 is displaced by moving away from the position of rest N, respectively in one or the other of the first and second angular directions 45, 46,
and not driving the second toothed element 50, when the handle 6 is displaced towards the position of rest N.

As shown in FIG. 27, the housing of the pump device 60 can be fixed to the second frame 8 of the hinge mechanism.

Figure 28:
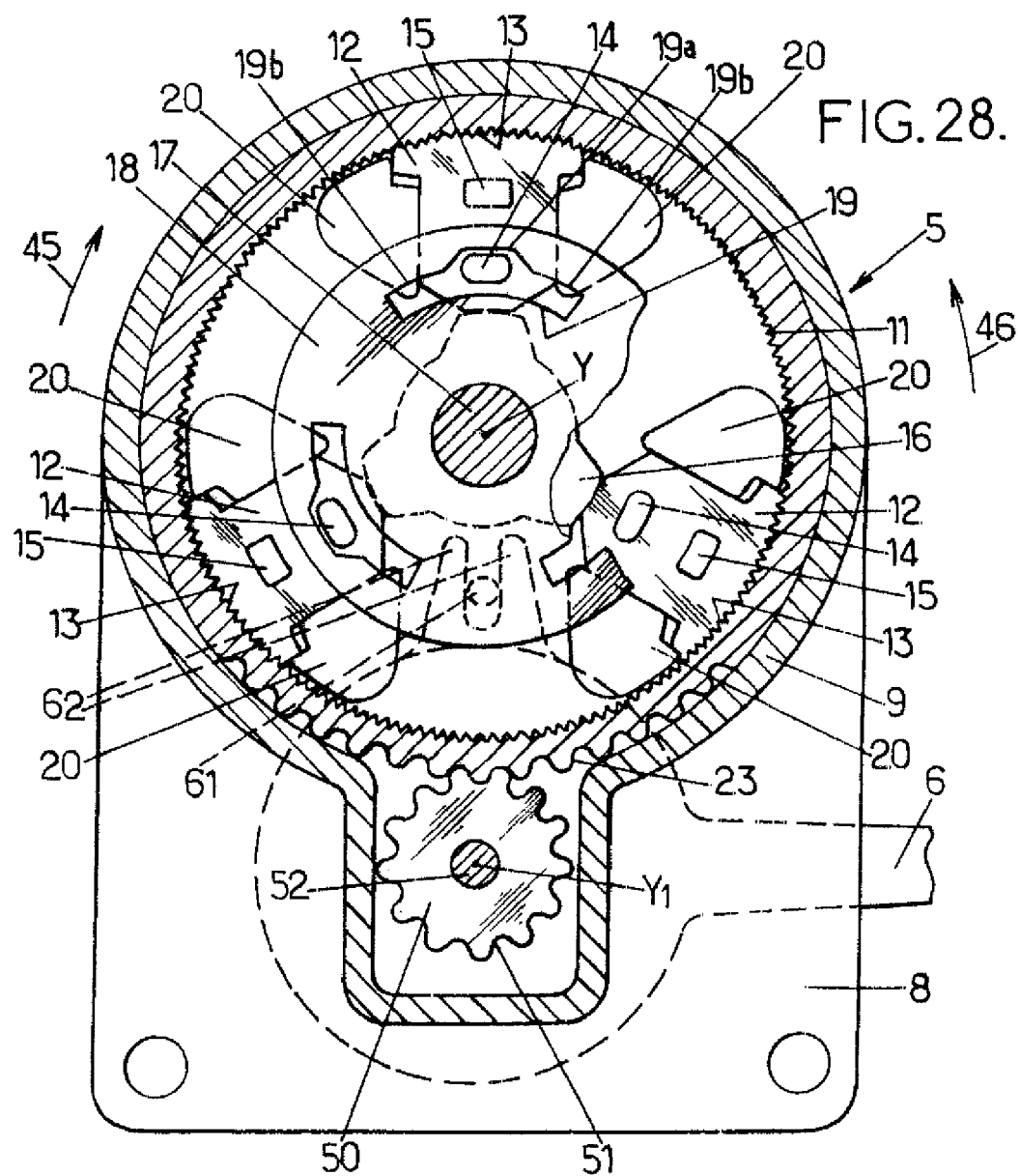
FIG. 28 is a cross-sectional view along the line XXVIII-XXVIII of FIG. 27.

Further, as shown in FIG. 28, the adjustment device 10 can be similar to that described previously in all the other embodiments of the invention, with the following differences:

the first cam 16 has a symmetry of order 3 about the axis of rotation Y so as to be displaceable either in the first angular direction 45, or in the second angular direction 46, starting from its position of rest, the adjustment device 10 no longer comprises the springs 21, the cam 16 being simply returned to its position of rest by one or more springs internal to the pump device 60, the first cam 16 being coupled to the handle 6 for example by means of a rigid metal rod 61 which is integral with the control ring 18 and which extends parallel to the axis of rotation Y, passing through an opening 61a in the form of a segment of a circle, centered on the axis of rotation Y and arranged in the second frame 8, said rod 61 being inserted between the two times of a fork 62 integral with the handle 6, said fork 62 delimiting a slit extending radially with respect to the axis of rotation Y1, and the cutouts 19 of the control ring 18 each comprise, in their outside edge, a central notch 19a flanked by two portions 19b of a smaller radius than the central notch, the first pin 14 of each first toothed element 12 being in correspondence with the central notch 19a when the adjustment device 10 is locked, as shown in FIG. 28.

The hinge mechanism according to the sixth embodiment of the invention operates as follows: when a user displaces the handle 6 by moving it away from the position of rest N, this movement rotatably drives the control ring 18 using the fork 62, so that the cam 16 no longer holds the first toothed elements 12 in locking position and the portions 19b of the cutouts 19 act on the respective first pins 14 of the different first toothed elements 12 to displace said first toothed elements into the unlocking position.

Further, the movement of the handle 6 drives the second toothed element 50 rotatably about its axis of rotation Y1, which second toothed element in turn drives the first frame 7 rotatably about the axis Y using the additional set of gear teeth 23 (see FIG. 29).

When the handle 6 is released by the user, it returns to the neutral position N under the effect of springs internal to the pump device 60, without driving the second toothed element 50 but driving with it the first cam 16 and the control ring 18 which return to the position of FIG. 28, returning the adjustment device 10 into locked position.

In the sixth embodiment of the invention, a hinge mechanism is thus obtained, controlled by a pump device and having an excellent mechanical strength thanks to the adjustment device 10.

Of course, the hinge mechanism 5 according to the present invention could be used in applications other than the angular adjustment of a backrest.

Such a hinge mechanism can be used if required for example for controlling lifting mechanism allowing adjustment of the height and/or the angle of the seat base, or in any other application where it is desired to control a relative pivoting movement between two elements of a vehicle seat.

The invention claimed is:

1. Hinge mechanism comprising:
    first and second frames mounted rotatably in relation to each other about an axis of rotation,
    a geared adjustment device connecting the first and second frames to each other, making it possible to adjust a relative angular position between said first and second frames, said adjustment device comprising:
        at least one first set of gear teeth belonging to the first frame and oriented radially inwardly;
        an additional set of gear teeth belonging to the first frame and oriented radially outwardly;
        at least one first toothed element selectively engaging with said first set of gear teeth and movable in relation to said first set of gear teeth; and
        a first actuation device capable of actuating the first toothed element to control the adjustment device; and
    a second toothed element borne by the second frame, said second toothed element selectively engaging with said additional set of gear teeth,
    wherein the second toothed element is mounted movable in relation to the second frame, and said hinge mechanism comprises a second actuation device capable of actuating said second toothed element.

2. Hinge mechanism according to claim 1, in which the adjustment device is capable of selectively immobilizing and releasing the relative rotation of the first and second flames with respect to each other.

3. Hinge mechanism according to claim 2, in which the first toothed element is mounted movable in relation to the one of the two frames which is not integral with the first set of gear teeth, said first toothed element being displaceable between, on the one hand, a locking position where said first toothed element is engaged with the first set of gear teeth and, on the other hand, an unlocking position where said first toothed element is not engaged with said first set of gear teeth.

4. Hinge mechanism according to claim 3, in which the first set of gear teeth is integral with the first frame and the first toothed element is mounted movable in relation to the second frame.

5. Hinge mechanism according to claim 4, in which the first actuation device comprises at least one first cam movable between first and second positions and elastically loaded towards the first position, said first cam acting on the first toothed element so that the first toothed element is in the locking position when said first cam is in the first position and in the unlocking position when said first cam is in the second position.

6. Hinge mechanism according to claim 5, in which the first cam is capable of pushing back the first toothed element into the locking position when said first cam is in the first position and allowing the first toothed element to be displaced towards the unlocking position when said first cam is in the second position.

7. Hinge mechanism according to claim 6, in which the first cam is integral with an unlocking ring capable of displacing the first toothed element into the unlocking position when said first cam is in the second position.

8. Hinge mechanism according to claim 2, in which the second toothed element is mounted movable in relation to the second frame between, on the one hand, a locking position where said second toothed element is engaged with the additional set of gear teeth and, on the other hand, an unlocking position where said second toothed element is not engaged with said additional set of gear teeth.

9. Hinge mechanism according to claim 8, in which the second actuation device comprises at least one second cam movable between first and second positions and acting on the second toothed element.

10. Hinge mechanism according to claim 9, in which said second cam is elastically loaded towards the first position.

11. Hinge mechanism according to claim 10, in which the second cam is capable of placing the second toothed element in the unlocking position when said second cam is in the second position and allowing the second toothed element to be displaced towards the locking position when said second cam is in the first position.

12. Hinge mechanism according to claim 11, in which the second toothed element is elastically loaded towards the locking position.

13. Hinge mechanism according to claim 9, in which the first and second cams are integral with each other.

14. Vehicle seat comprising a seat base and a backrest mounted pivotally in relation to the seat base by at least one hinge mechanism according to claim 1.

* * * * *